(12) United States Patent
Sonne et al.

(10) Patent No.: US 8,607,778 B1
(45) Date of Patent: Dec. 17, 2013

(54) SOLAR GUTTER, SOFIA FACIA, ARCHITECTURAL LEDGE AND GROUND ENGAGING SYSTEMS

(75) Inventors: Jeffrey K. Sonne, Titusville, FL (US); Robin K. Vieira, Titusville, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1149 days.

(21) Appl. No.: 12/110,049

(22) Filed: Apr. 25, 2008

(51) Int. Cl.
*E04D 13/18* (2006.01)

(52) U.S. Cl.
USPC ............... 126/621; 126/622; 126/643; 52/11; 52/12

(58) Field of Classification Search
USPC .......................... 126/621, 622, 643; 52/11, 12
See application file for complete search history.

(56) References Cited

U.S. PATENT DOCUMENTS

| | | | |
|---|---|---|---|
| 2,887,073 A | 5/1959 | Thompson | |
| 3,314,414 A | 4/1967 | Rowekamp | |
| 3,366,168 A | 1/1968 | Dale | |
| 4,028,895 A | 6/1977 | Franzmeier | |
| 4,102,324 A * | 7/1978 | Netherton | 126/663 |
| 4,127,103 A | 11/1978 | Klank et al. | |
| 4,162,671 A | 7/1979 | Christy | |
| 4,202,319 A | 5/1980 | Vlnz | |
| 4,257,400 A | 3/1981 | Brumbaugh | |
| 4,267,821 A | 5/1981 | Nelson | |
| 4,307,710 A | 12/1981 | Natter | |
| 4,312,325 A | 1/1982 | Voges et al. | |
| 4,375,805 A | 3/1983 | Weber | |
| RE31,321 E | 7/1983 | Harrison | |
| 4,581,857 A * | 4/1986 | Harbom | 52/12 |
| 4,611,576 A | 9/1986 | Stephens et al. | |
| 4,886,554 A | 12/1989 | Woodring et al. | |
| 6,837,236 B1 | 1/2005 | Lichtenberger | |
| 2005/0016524 A1* | 1/2005 | Broatch | 126/622 |
| 2006/0185203 A1* | 8/2006 | Bittle et al. | 40/541 |
| 2008/0190412 A1* | 8/2008 | Cristofari | 126/621 |

* cited by examiner

*Primary Examiner* — Avinash Savani

(74) *Attorney, Agent, or Firm* — Brian S. Steinberger; Law Offices of Brian S. Steinberger, P.A.

(57) ABSTRACT

Systems, apparatus, devices and methods of using and mounting solar collectors and photovoltaic collectors in gutters or directly along fascia and eaves and on architectural ledges on buildings, along building walls at various heights above the ground, as well as in ground engaged collectors for providing heated water, power and/or lighting. The collectors can have a pair of conduits/tubes for passing water therethrough. Each of the collectors can be attached to one another by mateably interlocking male and female connectors on the sides of each collector to one another.

10 Claims, 27 Drawing Sheets

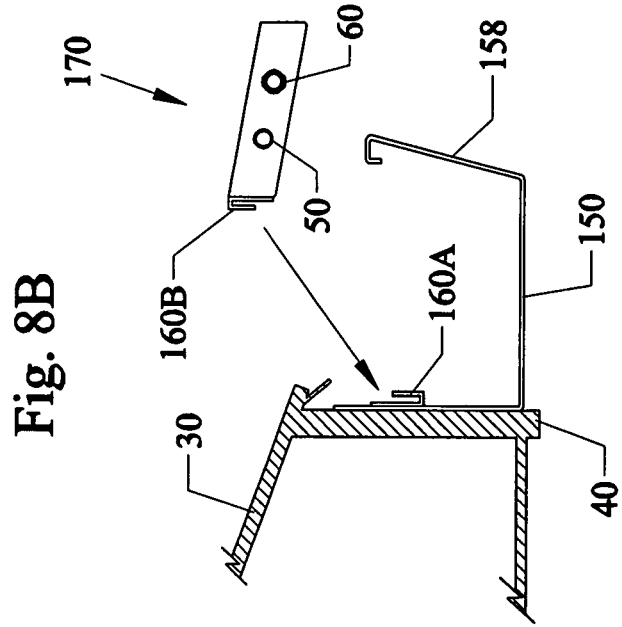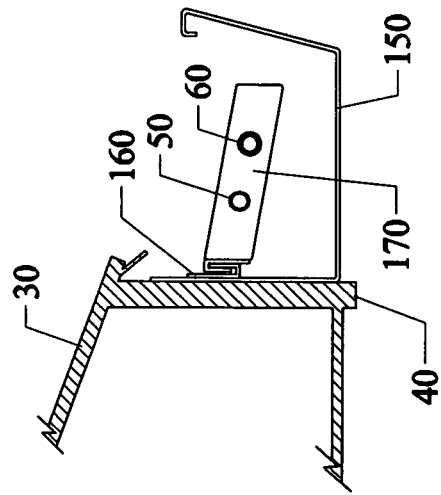

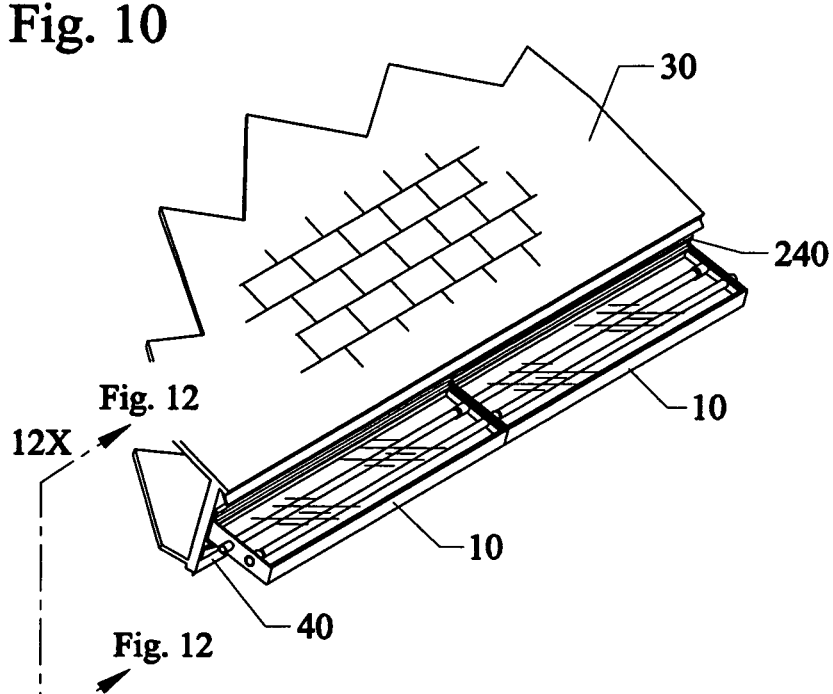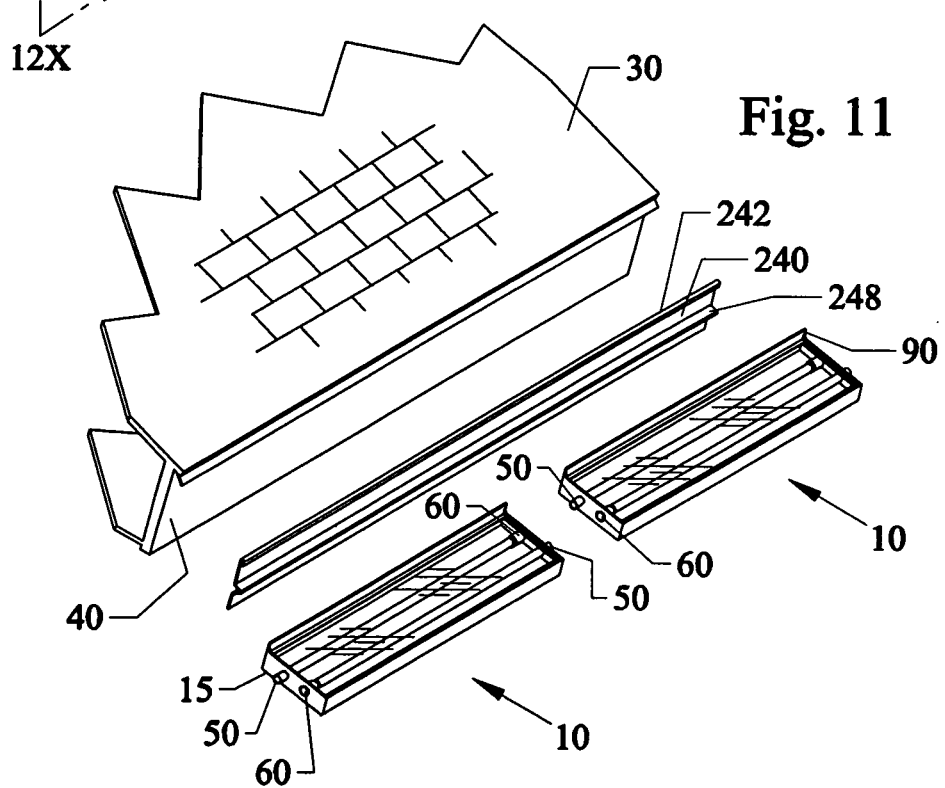

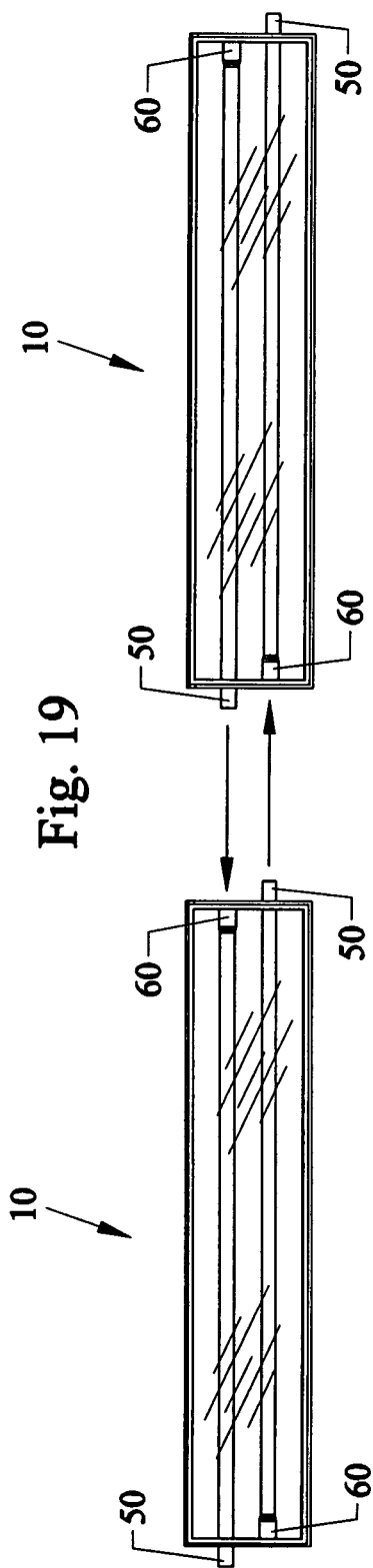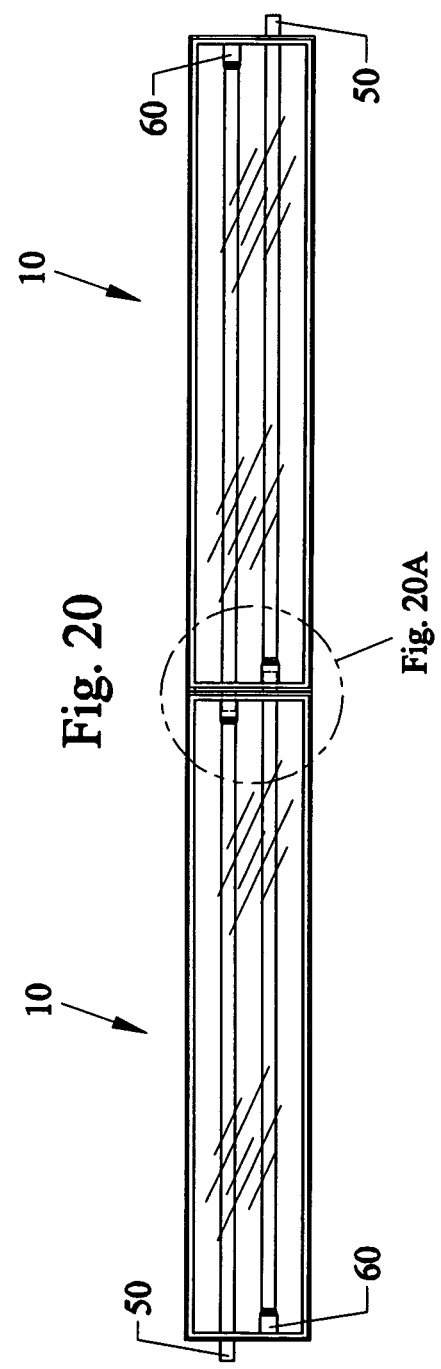

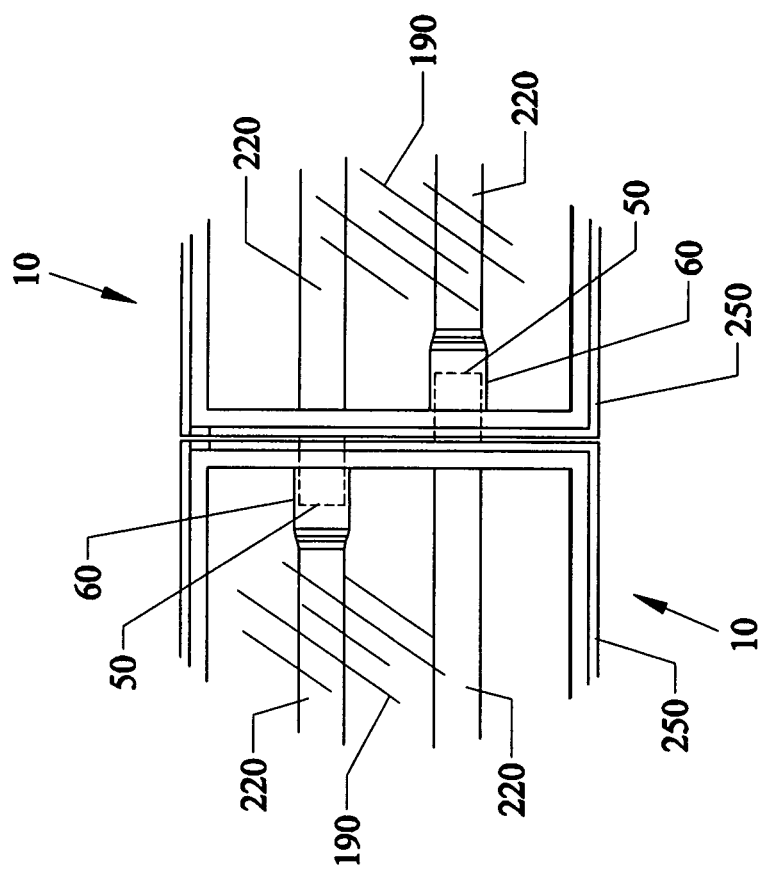

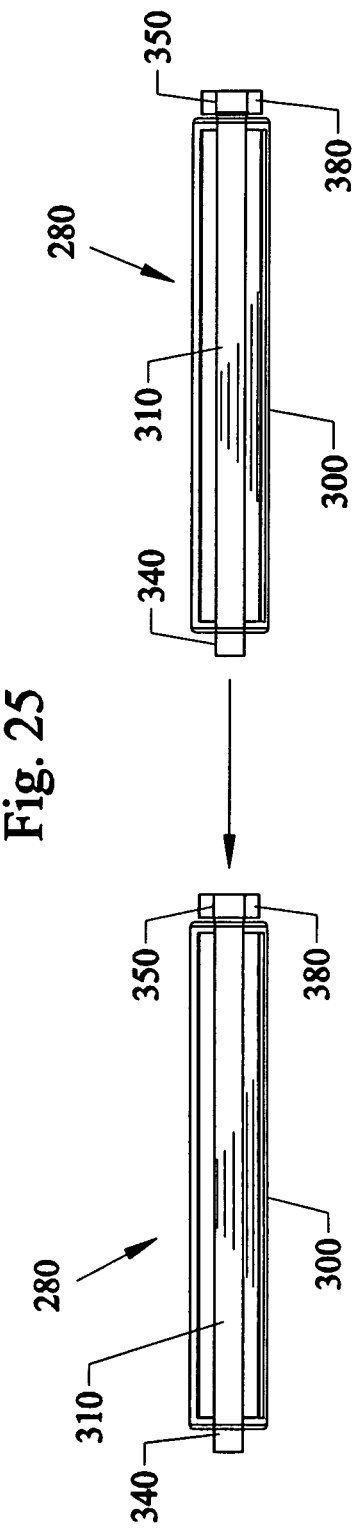
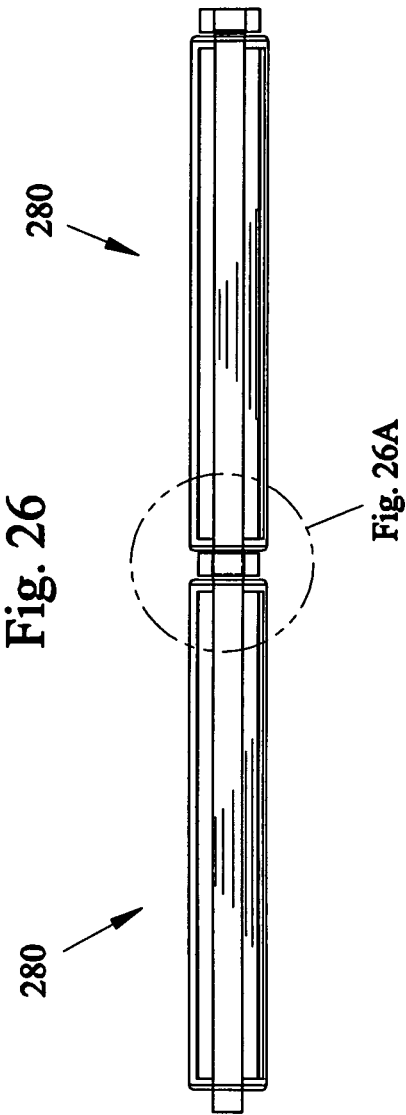

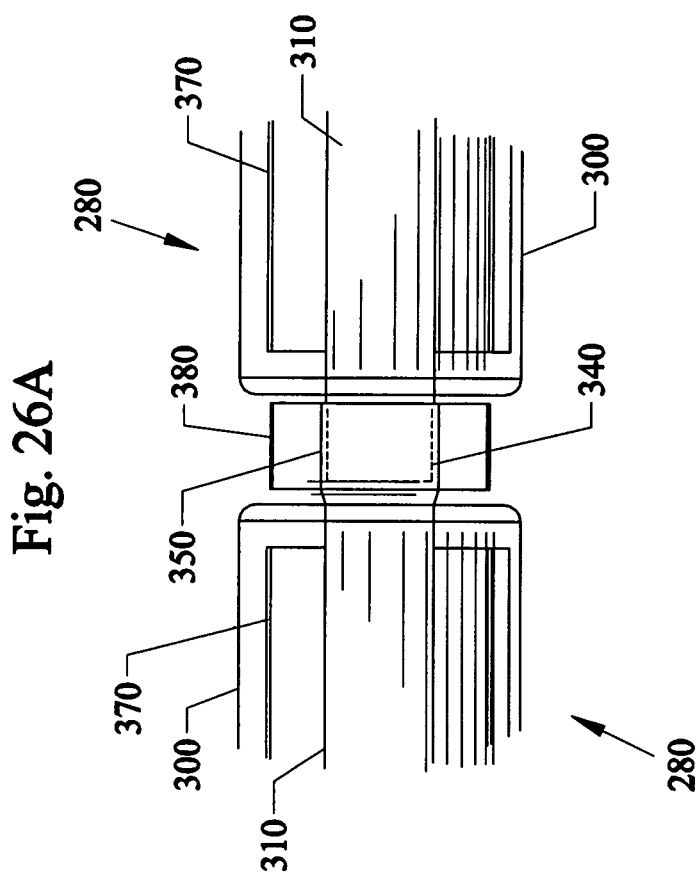

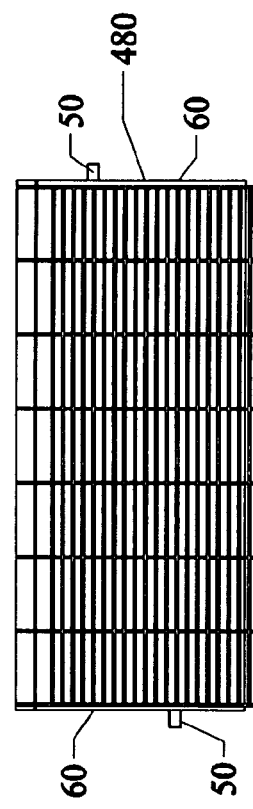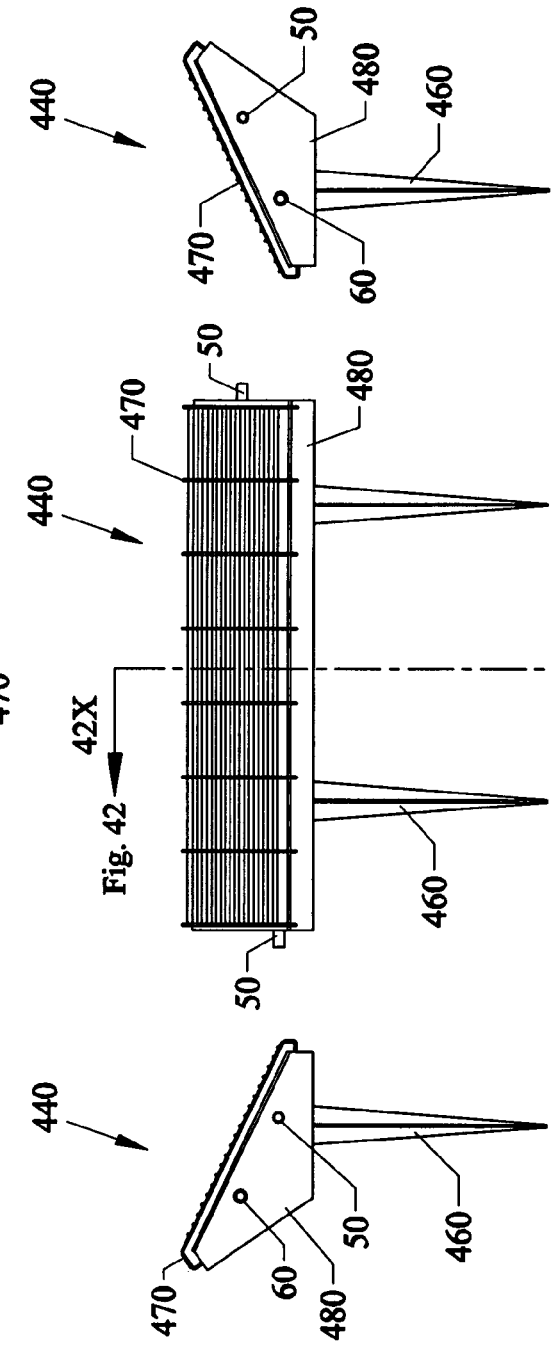

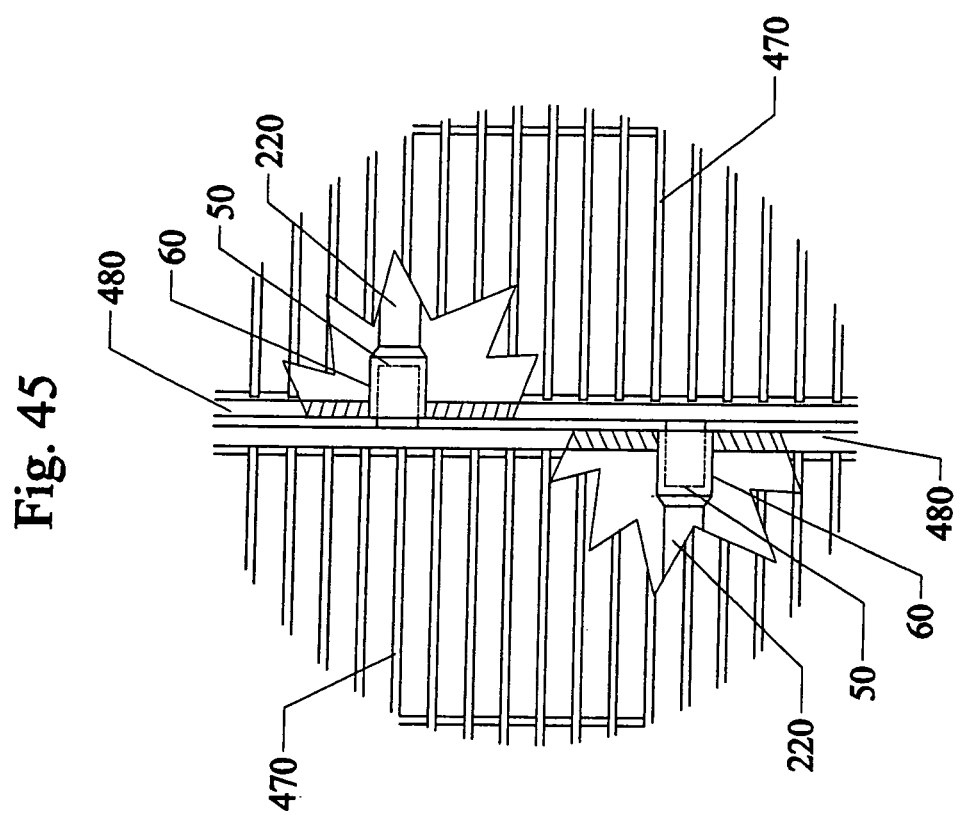

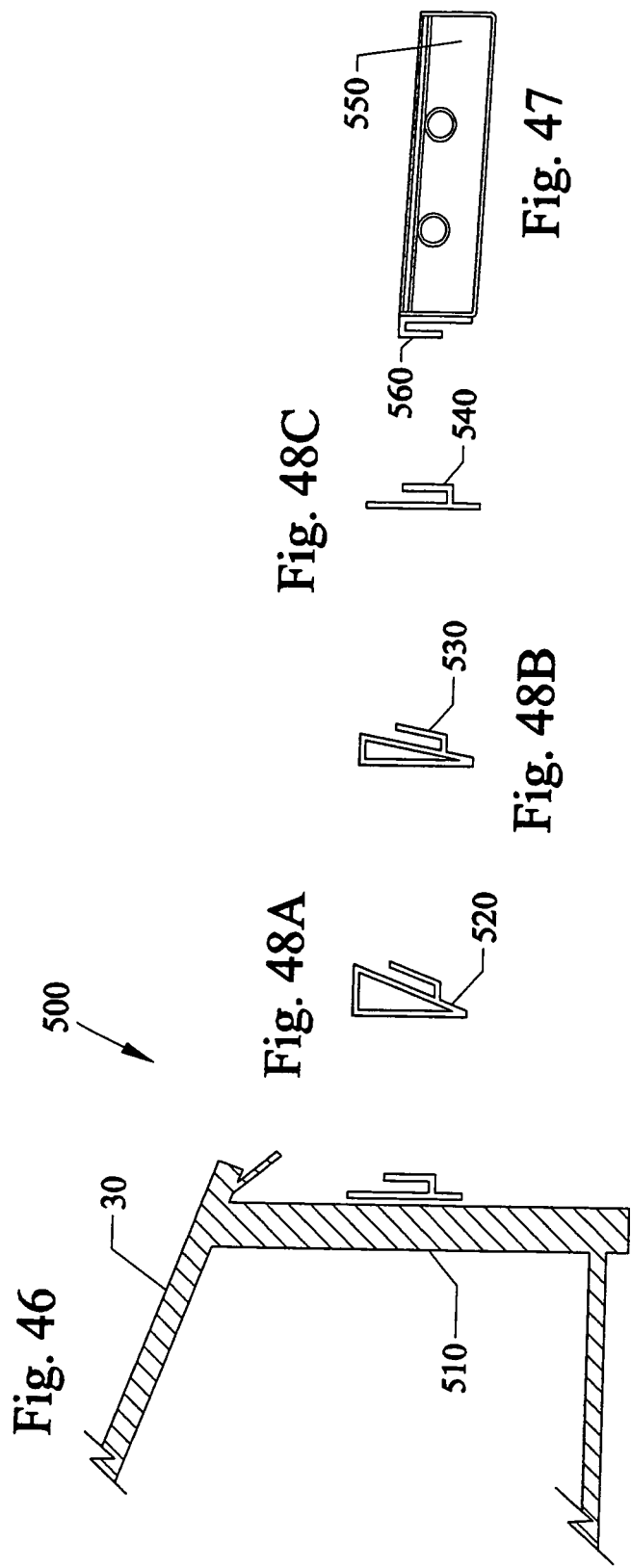

SOLAR GUTTER, SOFIA FACIA, ARCHITECTURAL LEDGE AND GROUND ENGAGING SYSTEMS

This invention relates to solar collectors, in particular to systems, apparatus, devices and methods of using and mounting solar collectors in gutters or along roof soffit fascias and eaves, and on architectural ledges of buildings, at various heights along building walls as well as in ground engaged collectors for providing heated water, power and/or lights.

BACKGROUND AND PRIOR ART

Solar power systems are popular for mounting on rooftops such as residential homes, for heating water supplies and/or providing extra power supplies. Although popular, the roof top solar panels and collectors have many problems. For example, the roof mounting generally require penetrations through the roof to fasten the panels and collectors. The penetrations create extra openings for allowing water penetration therethrough during storms.

Other problems occur by leaving the roof topped collectors and panels on the roof over extended periods of time, which can result in fungus buildup and deterioration of the roof surface where moisture can become trapped between the roof collector(s)/panel(s) and the roof surface.

Still other problems can develop if the roof collectors/panels are torn off during storms which can result in the portions of the roof becoming damaged and allowing water damage to penetrate into the structure.

Additionally, the roof mounted collectors and panels are noticeable and detract from the aesthetic appearance of the residential buildings. Also, the collectors and panels can cover decorative shingles and roof surfaces further detracting away from the appearance. Thus, the roof mounted collectors and panels are often looked at as negative perceived by people and not desirable.

Various patents have been approved over the years for mounting solar devices on or adjacent roof tops. See for example, U.S. Pat. Nos. 3,366,168 to Dale; 4,127,103 to Klank et al.; 4,202,319 to Vinz; 4,162,671 to Christy; 4,257,400 to Brumbaugh; 4,267,821 to Nelson; 4,307,710 to Natter; 4,312,325 to Voges et al; 4,375,805 to Weber; RE 31,321 to Harrison; 4,886,554 to Woodring et al.; and 4,611,576 to Stephens et al. However, none of these devices overcomes all the problems to the prior art listed above.

U.S. Pat. No. 4,028,895 to Franzmeier described a "rain gutter attachment", title, which is restricted to heating up the top of a downspout connection from sunlight to prevent the downspouts from freezing up during cold weather, columns 2-4. U.S. Pat. No. 2,887,073 to Thompson describes a self-cleaning gutter and downspout attachment to collect debris", title, that allows for running cold and hot water through a gutter to allow for greater drainage and to keep the gutter and downspouts from becoming clogged. However, none of these patents have any descriptions or teachings for using the gutter itself to mount solar panels, and the like for heating water, and providing power.

Thus, the need exists for solutions to the above problems with the prior art.

SUMMARY OF THE INVENTION

A primary objective of the present invention is to provide systems, apparatus, devices and methods of using and mounting solar collectors and panels in gutters to heat water and/or provide electrical power for lights, and the like.

A secondary objective of the present invention is to provide systems, apparatus, devices and methods of using and mounting solar collectors and panels along fascias and eaves to provide heated water and provide electrical power for lights, and the like.

A third objective of the present invention is to provide systems, apparatus, devices and methods of using and mounting solar collectors and panels on or along roof edges that remain unseen to those on the ground and do not detract from the appearance of the roof of the structure.

A fourth objective of the present invention is to provide systems, apparatus, devices and methods of using and mounting solar collectors and panels on and along roof edges that do not require any penetrations through the roof itself.

A fifth objective of the present invention is to provide systems, apparatus, devices and methods of using and mounting solar collectors and panels on and along roof edges that does not allow for the buildup of fungus and deterioration effects between a roof surface and the collectors/panels.

A sixth objective of the present invention is to provide systems, apparatus, devices and methods of using and mounting solar collectors on or along roof edges that if pulled off by storms, and like does not damage the underlying roof surface.

A seventh objective of the present invention is to provide systems, apparatus, devices and methods of using and mounting solar collectors gutters that is less expensive than separately installing solar collectors and panels on roof tops since installation costs are only incremental as being part of the gutter installation or as a retrofit with the gutters.

An eighth objective of the present invention is to provide systems, apparatus, devices and methods of using and mounting solar collectors and panels along architectural ledges to provide heated water and/or provide electrical power for lights, and the like.

A ninth objective of the present invention is to provide systems, apparatus, devices and methods of using and mounting solar collectors and panels in ground engaging collector housings to provide heated water and/or provide electrical power for lights, and the like.

A tenth objective of the present invention is to provide systems, apparatus, devices and methods of using and mounting solar collectors and panels on the north, or other non-optimal side of a building in a manner that still allows the collectors to operate efficiently and effectively without the aesthetic and cost drawbacks of significant support structures that conventional collectors would require especially for these orientations.

An eleventh objective of the present invention is to provide systems, apparatus, devices and methods of using and mounting solar collectors and panels such that their performance is enhanced by sunlight reflecting onto the collector surface from the fascia surface, gutter surface(s), and/or building wall surface(s).

Novel embodiments of the invention can include collecting solar energy via solar thermal and/or electric (photovoltaic) collectors being 1) attached or added to the edge of building soffit fascias, and/or 2) being placed within or integrated into either specifically designed or existing, standard rainwater gutters. In the case of the collectors that are added directly to the edge of soffit fascias, a separate gutter can also be added/included on either side of the collector.

The invention versions can be long, narrow units, that can be between approximately 3" and approximately 12" wide, with the length typically determined by the length of the building fascia. The thermal collector can have an absorber plate, made of copper or other appropriate material, piping, and insulation similar to conventional collectors (such as but not limited to polyisocyanurate foam sheet board) and can or can not include a glazed surface (such as but not limited to glass). Other versions can include solar electric (photovoltaic) cells, such as but not limited to crystalline and thin-film, being used instead of or in combination with the thermal collector.

Embodiments of the invention can be attached to the building soffit fascia in such a way as to not require any roof surface penetrations for either mechanical fastening, piping, or wiring (in the case of photovoltaic collectors). The collectors can be either no more noticeable than a gutter system, or be configured in such a way as to allow the collector to blend in with the roof and/or building so appearance is not perceived negatively by most people. Since appearance is anticipated as not being a negative, the invention can also be able to be used on buildings that are not oriented properly for conventional solar systems (e.g. the house faces south so a conventional solar panel would have to be mounted facing the front of the house creating aesthetics/acceptability issues).

Because of the relatively narrow width of the envisioned collectors, this invention can allow for collectors to be installed along walls at other heights and locations (e.g. incorporated into/as decorative trim), or even installed close to the ground to allow the collector to be largely hidden (by e.g. landscaping, and the like).

Further objects and advantages of this invention will be apparent from the following detailed description of the presently preferred embodiments which are illustrated schematically in the accompanying drawings.

BRIEF DESCRIPTION OF THE FIGURES

FIG. 8A is another cross-sectional view of "Ice proof" sixth gutter embodiment.

FIG. 8B is another view of FIG. 8A with the module removed from the gutter.

FIG. 10 is a perspective view of an eighth embodiment of two solar collector modules attached to an edge of a roof without a gutter.

FIG. 11 is an exploded view of collector modules, bracket and roof edge of FIG. 10.

FIG. 19 is a top view of two solar collector modules of previous figures ready to mate.

FIG. 20 is a top view of the two modules of FIG. 19 mated together.

FIG. 20A is an enlarged top view of the interconnected modules of FIG. 20.

FIG. 25 is a top view of the two tube collectors of FIG. 21 ready to mate together.

FIG. 26 is a top view of two tube collectors of FIG. 25 mated to one another.

FIG. 26A is an enlarged top view of the interconnected modules of FIG. 26.

FIG. 38 is a top view of a single ground mounted collector of FIG. 36.

FIG. 39 is a left side view of the ground mounted collector of FIG. 38.

FIG. 40 is a front view of the ground mounted collector of FIG. 38.

FIG. 41 is a right side view of ground mounted collector of FIG. 38.

FIG. 45 is an enlarged top view of the interconnected collectors of FIG. 44.

FIG. 46 is a side view of a building structure with collector mounting plate.

FIG. 47 is a side view of collector module with shim mount.

FIG. 48A is a side view of an angled collector mounting plate.

FIG. 48B is a side view of another angled collector mounting plate.

FIG. 48C is a side view of a perpendicular collector mounting plate.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figure 1:
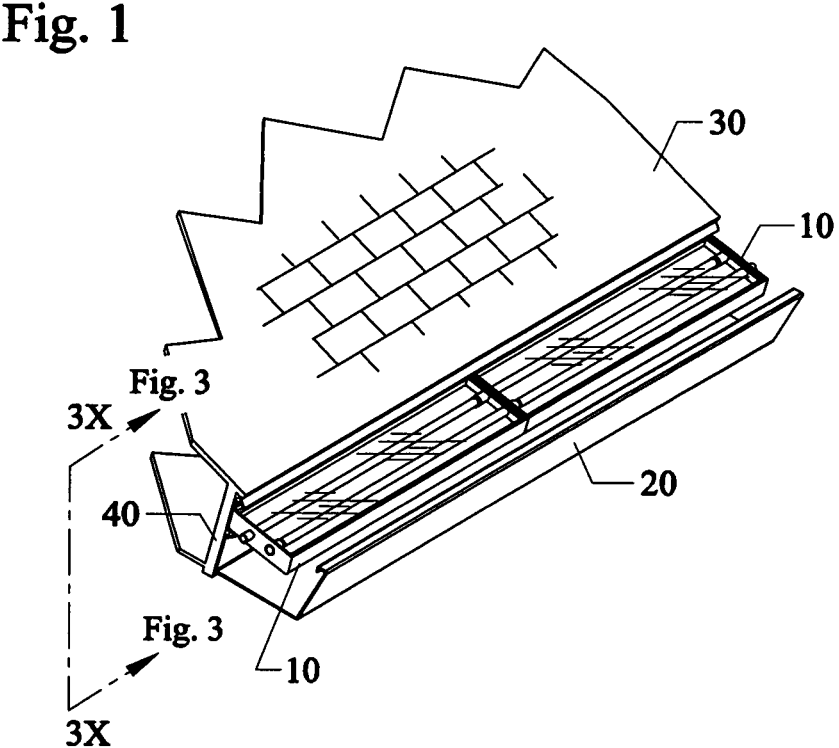
FIG. 1 is a perspective view of the solar collector gutter with two collector modules.
Figure 2:
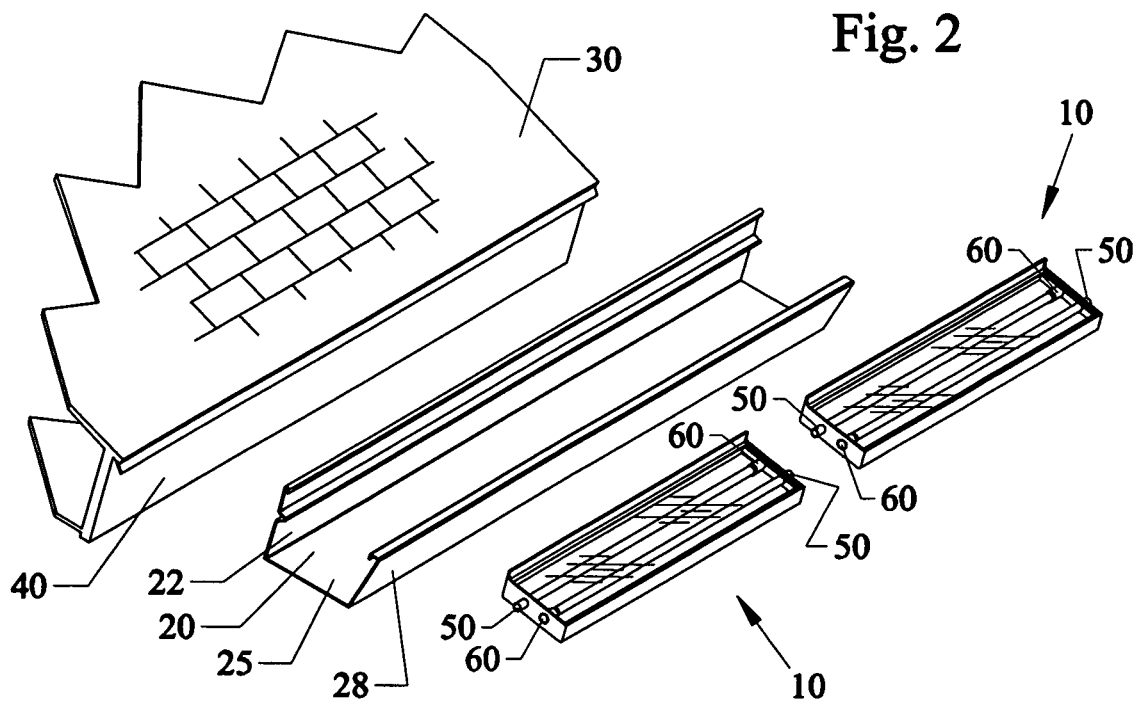
FIG. 2 is an exploded view of the components of FIG. 1.
Figure 3A:
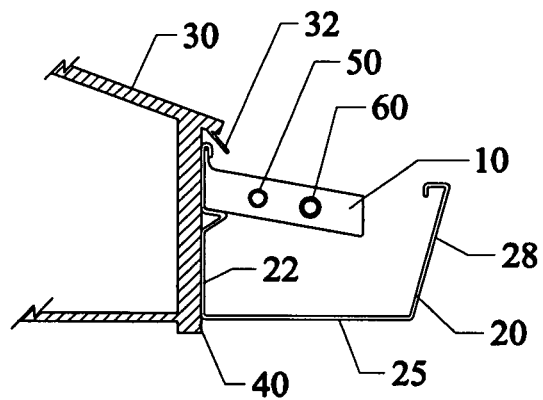
FIG. 3A is a cross-sectional view of the gutter with modules of FIG. 1 along arrows 3X.
Figure 3B:
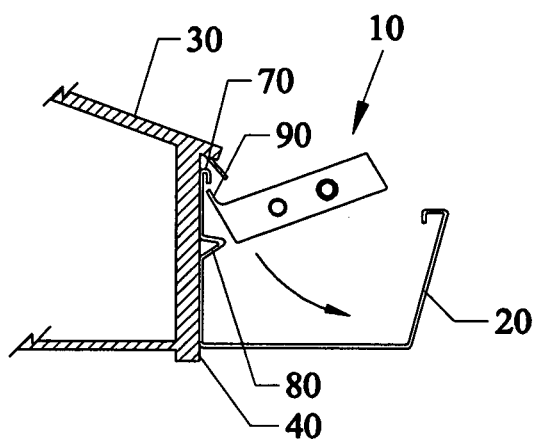
FIG. 3B is another view of FIG. 3A with module being installed in the gutter.
Figure 3C:
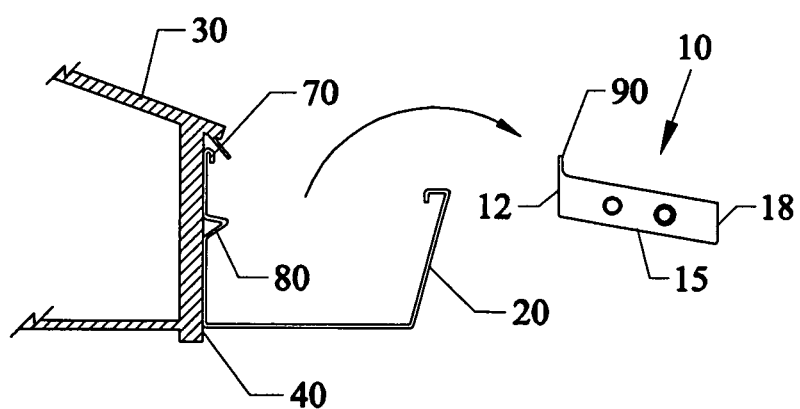
FIG. 3C is another view of FIG. 3A with module removed from the gutter.

The components will now be described.
10. Solar water heating module.
12. back of module
15. bottom of module
18. front of module
20. Module mounting rain gutter #1.
22. back wall
25. floor
28. front wall
30. Roof.
32. Overhanging edge of roof
40. Soffit fascia.
50. Male pipe connection.
60. Female pipe connection.
70. Module mounting hook.
80. Module mounting step.
80A. Enlarged mounting step
80B. floor as mounting step
90. Module mounting rail.
100. Module mounting rain gutter #2.
105. step down interior front portion of gutter 100
110. Module mounting rain gutter #3.
115. front interior portion of gutter 110
120. Leaf screening rain gutter.
122. bent upper front lip.
130. Module mounting rain gutter #4.
132. rear/back wall
138 front wall
140. Leaf screening module lip.
150. Module mounting rain gutter #5.
158. front wall of gutter
160. "Ice Proof" module slide mount.
160A. slide mount on rear wall of gutter
160B slide mount on module 170
170. "Ice Proof" module.
180. Extruded one-piece rain gutter/module body.
182. rear/back wall
185. floor
186. extruded open top box for housing solar module components
188. front wall
190. Glazing.
200. Collector plate.
210. Air space.
220. Fluid pipes.
230. Insulation.
240. Module mounting bracket (no gutter).
242. module mounting hook
248. module mounting step
250. Module body.
252. Ledge Edges
260. Fluid pipe egress.
270. Fluid conduit/collector extrusion.
280. Evacuated tube collector module.
290. Evacuated tube rain gutter assembly.
300. Glazing tube.
310. Collector fluid tube.
320. Glazing end cap
340. Collector fluid tube male connection
350. Collector fluid tube female connection
360. flat mounting bracket for gutter
370. Tube collector reflector
380. Collector/fluid tube mounting pedestal.
390. Photovoltaic collector
391. solar cells
392. upper surface
394 triangular base
396. flat rear wall of triangular base
398. under surface of the solar collectors
400. Battery
410. Light
420. Photovoltaic mounting rain gutter
422. rear face
424. mounting hook
426. mounting step
428. stepped floor
429. elongated cavity under floor
430. Architectural ledge on home
440. ground mount solar collector
450. ground
460. ground spike
470. Burn safety guard
472. upper end
478. lower end
480. ground collector body
482. upper end
484. back wall surface
488. lower end
486. lower floor surface
488. front edge
500. wall collector mounting plate
510 collector mounting plate
520. angled north mount
530. angled central mount
540. south mount
550. collector with shim mount
560. shim mount Gutter Mounted Modular Solar/Photovoltaic Collectors with Water Tubes/Conduits FIG. 1 is a perspective view of the solar collector gutter 20 with two collector modules 10. FIG. 2 is an exploded view of the components of FIG. 1 separated from an eave along a lower overhanging edge of a roof 30. FIG. 3A is a cross-sectional view of the gutter 20 with modules 10 of FIG. 1 along arrows 3X. FIG. 3B is another view of FIG. 3A with module 10 being installed in the gutter 20. FIG. 3C is another view of FIG. 3A with module 10 removed from the gutter 20.

The solar water heating module 10 can include a pair (or more) of parallel pipes running through a generally rectangular box, where plural module(s) can be interlocked together by interconnecting male pipe connections 50 and female pipe connections 60 with alternative pipe connections on adjacent module(s). The solar water heating module can include a transparent cover that allows for water running through the pipes to be heated by sunlight. Versions of the module 10 will also be described below. The pipes can run heated water to hot water heaters, swimming pools, spas, and the like.

Referring to FIGS. 1-3C, an elongated gutter 20 such as an extruded metal gutter can have a back wall 22 mounted on a fascia 40 that is across the eave portion along the lower overhanging edge of a roof 30 by conventional fasteners, such as but not limited to nails and screws, and the like. The gutter 20 can have an upper module mounting hook 70 below the overhanging edge 32 of the roof, and a module mounting step 80 between the upper hook 70 and the floor 25.

Once the gutter 20 is attached to the fascia 40, the installer can interconnect each of the modules 10 together by interlocking male pipe connection 50 and female pipe connection 60 on one end of one module 10 to a female pipe connection 60 and male pipe connection 50 on an adjacent end of another module 10. Next, the upwardly protruding module mounting rail 90 on the module(s) 10 can be angle inserted into the module mounting hook 70 on the back wall 22 of the gutter and a rear portion of the bottom 15 of the module can rest on the module mounting step 80 as shown in FIGS. 3A-3C. The mounting arrangement allows for a space between the front 18 of the module 10 and the front wall 28 of the gutter 20 which allows for water draining from the roof to pass into the gutter 20. Also, the bottom 15 of the mounted module 15 is able to rest above the floor 25 of the gutter 20, which also does not inhibit or block any water flowing through the gutter 20 itself.

Figure 4:
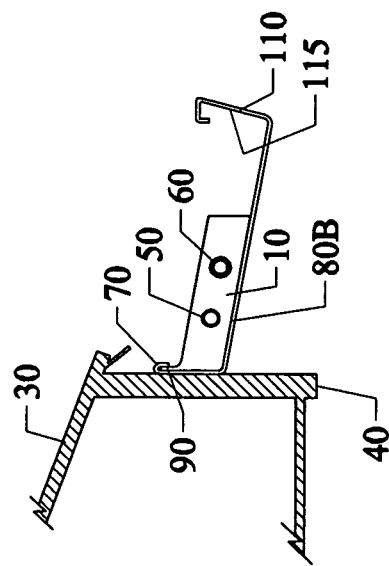
FIG. 4 is another cross-sectional view of a second gutter embodiment.

FIG. 4 is another cross-sectional view of a second gutter embodiment 100, where the module mounting step 80A is part of the floor of the gutter 100. Here the module 10 can be installed similar to the previous version. The front of the gutter 100 has a drop down step portion 105 which similarly can fill up with water draining from the roof 30. Also, the step portion 105 is wide enough to also not inhibit or block any water flowing through the gutter 100.

Figure 5:
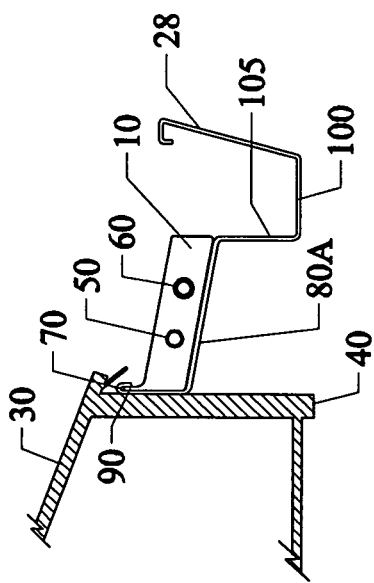
FIG. 5 is another cross-sectional view of a third gutter embodiment.

FIG. 5 is another cross-sectional view of a third gutter embodiment 110, wherein the former step portion 80 is now a full floor 80B of the gutter, and can be installed similar to the previous embodiments. The front interior portion 115 of the gutter 110 can also similarly fill up with water draining from the roof 30. Also the front interior portion between the module 10 and the front wall 28 is wide enough to also not inhibit or block any water flowing through the gutter 110.

Figure 6:
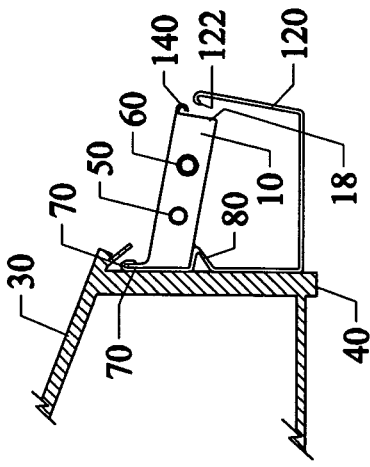
FIG. 6 is another cross-sectional view of a fourth gutter embodiment.

FIG. 6 is another cross-sectional view of a fourth gutter embodiment 120, where the front wall 28 is spaced close to the front 18 of the module 10. Here, the module 10 can be installed similar to the previous embodiments. The module 10 can include a forward protruding leaf screening module lip 140, which together with closely located front bent upper lip 122 of the gutter 120 helps prevent large debris such as leaves, and the like on the roof 30 or falling from above from passing into the gutter 120. The narrow space between the module lip 140 and bent lip 122 of gutter 120 is large enough to allow for rainwater to drain into the gutter 120.

Figure 7:
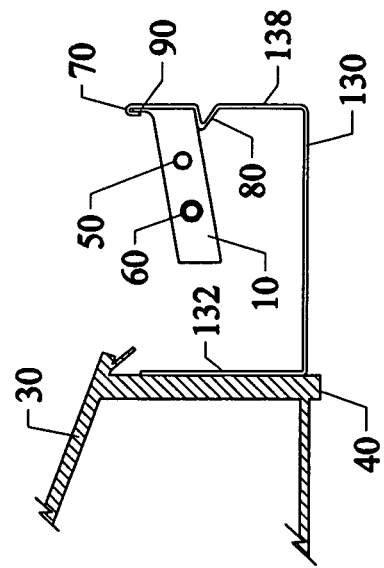
FIG. 7 is another cross-sectional view of a fifth gutter embodiment.

FIG. 7 is another cross-sectional view of a fifth gutter embodiment 130, where the module 10 can be mounted by a hook 70 and step 80 on the inside of the front wall 138 of the gutter to allow the collector to operate more effectively if mounted on the north, or other non-optimal side of the building. Here, the module 10 can be installed similar to the previous embodiments. The rear wall 132 of the gutter 130 can be attached to the fascia 40 in a similar manner to gutters previously described. The rear interior portion of the gutter 130 adjacent rear wall 132 can also similarly fill up with water draining from the roof 30. Also the rear interior portion between the module 10 and the rear wall 132 is wide enough to also not inhibit or block any water flowing through the gutter 130.

FIG. 8A is another cross-sectional view of "Ice proof" module 170 in the sixth gutter embodiment 150 interlocked by a slide mount 160. FIG. 8B is another view of FIG. 8A with the module 170 removed from the gutter 150. The back wall 152 of the gutter 150 can have an elongated slide mount 160A having an upwardly extending front lip, the latter of which can hook a downwardly extending lip on a slide mount 160B on the module 170. The deep hook connection in the slide mount 160 connection helps prevent the solar module 170 from disengaging from the gutter during freezing conditions when water in the gutter can become ice, and push up under the module 170. The rest of the module 170 is similar to the module 10 of the previous embodiments. The front interior portion of the gutter 110 can also similarly fill up with water draining from the roof 30. Also the front interior portion between the module 170 and the front wall 158 is wide enough to also not inhibit or block any water flowing through the gutter 150. Note that the "Ice proof" slide mounting system can also be used as an alternative mounting system for the collector modules even in warmer climates where ice formation is not a concern, including for mounting the modules to existing gutters and to fascia without gutters.

Figure 9:
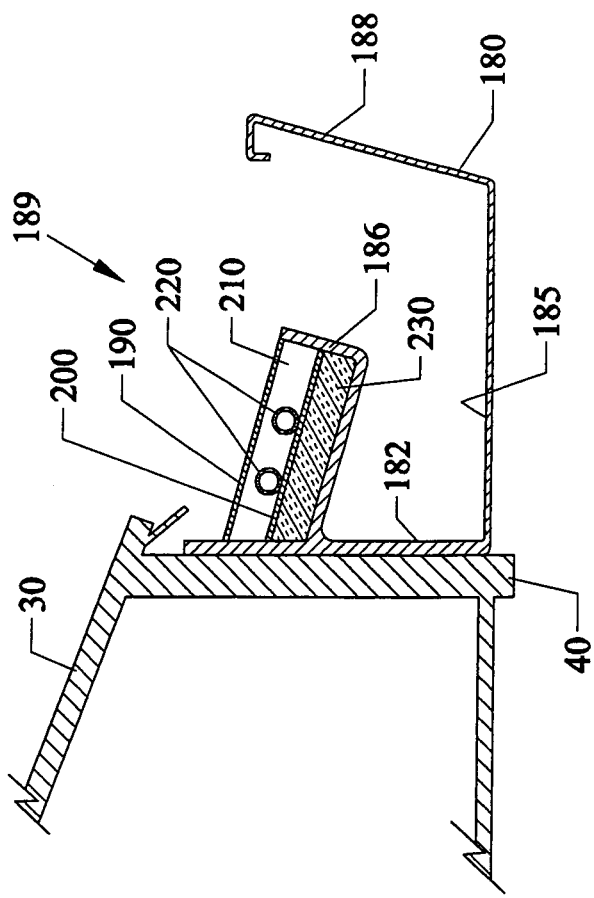
FIG. 9 is a cross-sectional view of a one-piece extruded seventh gutter embodiment.

FIG. 9 is a cross-sectional view of a one-piece extruded seventh gutter embodiment 180 which can have a solar module box portion 186 extending from the rear wall 182 above the floor 185 of the gutter 180. The rear wall 182 can attach to the fascia 40 in a similar manner to those previously described. Inside the open top box portion 186 can be a insulation layer 230, a collector plate 200 above the insulation layer 230 and a pair of fluid pipes 220 similar to those previously described. Across the open top of extruded box 186 can be a transparent glazing covers 190 for allowing sunlight to pass therethrough and heat up the pipes 220 which can carry water to hot water heaters, pools, spas, and the like. The front interior portion of the gutter 180 can also similarly fill up with water draining from the roof 30. Also the front interior portion between the module box 186 and the front wall 188 is wide enough to also not inhibit or block any water flowing through the gutter 180.

Figure 12A:
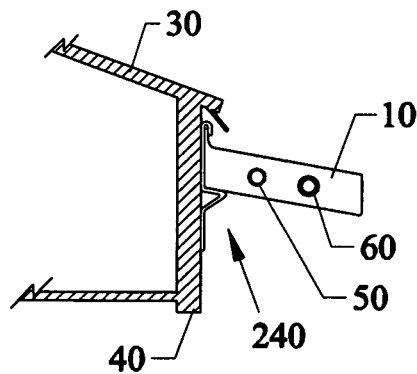
FIG. 12A is a side cross-sectional view of a mounted module of FIG. 10 along arrows 12X.
Figure 12B:
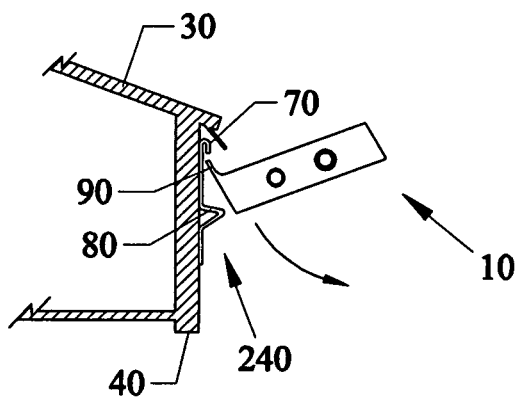
FIG. 12B is another view of FIG. 12A with module being installed on roof edge bracket.
Figure 12C:
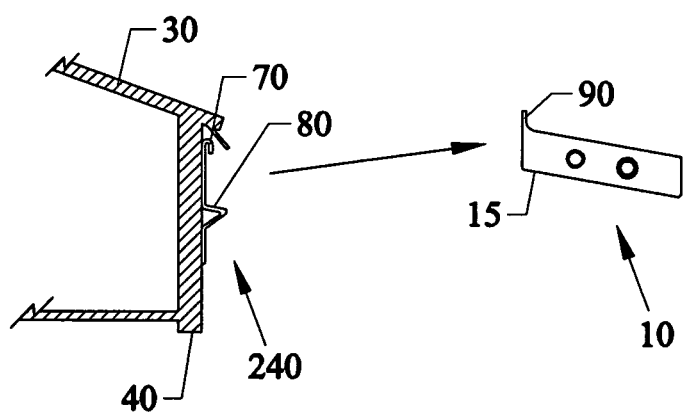
FIG. 12C is another view of FIG. 12A with module removed from roof edge bracket.

Soffit Facia Mounted Modular Solar Thermal Collectors with Water Tubes/Conduits and Photovoltaic Collectors FIG. 10 is a perspective view of an eighth embodiment of two solar collector modules 10 directly attached to a module mounting bracket pre-mounted along a fascia of the roof, that does not have a gutter. FIG. 11 is an exploded view of collector modules 10, bracket 240 and roof edge of FIG. 10. FIG. 12A is a side cross-sectional view of a mounted module 10 of FIG. 10 along arrows 12X. FIG. 12B is another view of FIG. 12A with module 10 being installed on roof edge bracket 240. FIG. 12C is another view of FIG. 12A with module 10 removed from roof edge bracket 240.

Referring to FIGS. 10-12C, the elongated bracket 240 can have an upper modular mounting hook 242 similar to mounting hook 70 previously described, and a mid located module mounting step 248 similar to step 80 previously described. The module(s) 19 can be installed mounting bracket 240 by angle inserting upper module mounting rail 90 into lower facing hook 242, and then resting a rear bottom portion 15 of the module 10 on step 248. The module(s) 10 can be angled slightly downward so that water easily passes from roof 30 and over the top of the module(s) 10 to then fall on the ground below. The slide mount of FIGS. 8A and 8B is an alternative mounting system for directly mounting the solar modules to the fascia without a gutter.

Modular Solar/Photovoltaic Collectors

Figure 13:
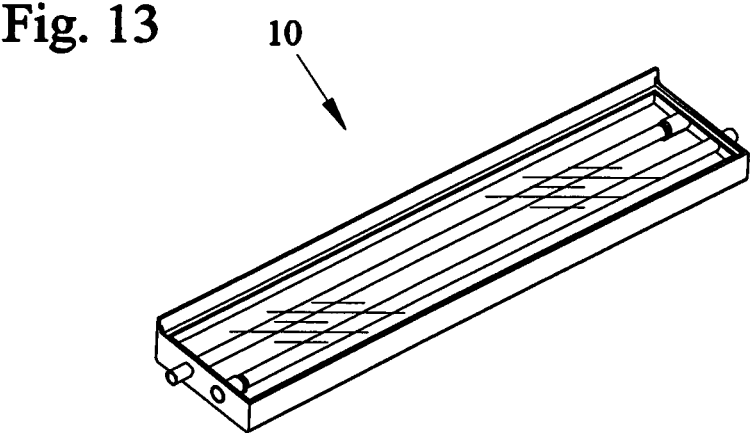
FIG. 13 is a perspective view of a rectangular solar collector module of previous figures.
Figure 14:
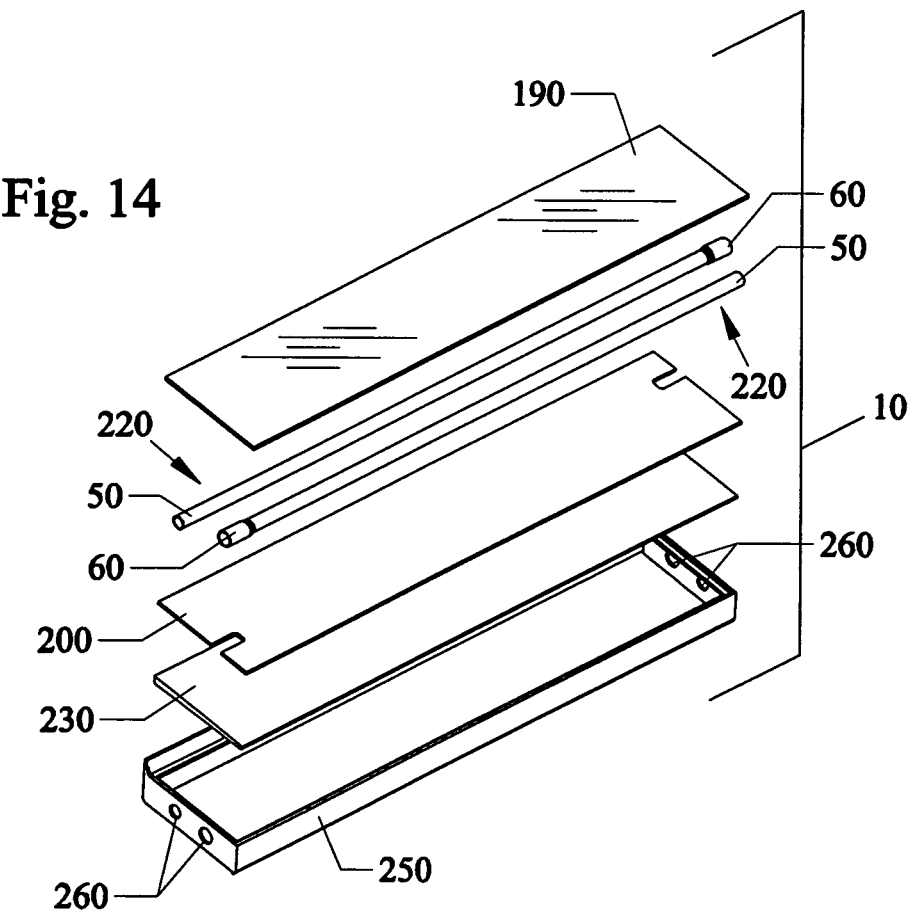
FIG. 14 is an exploded view of the solar collector module components of FIG. 13.
Figure 15:
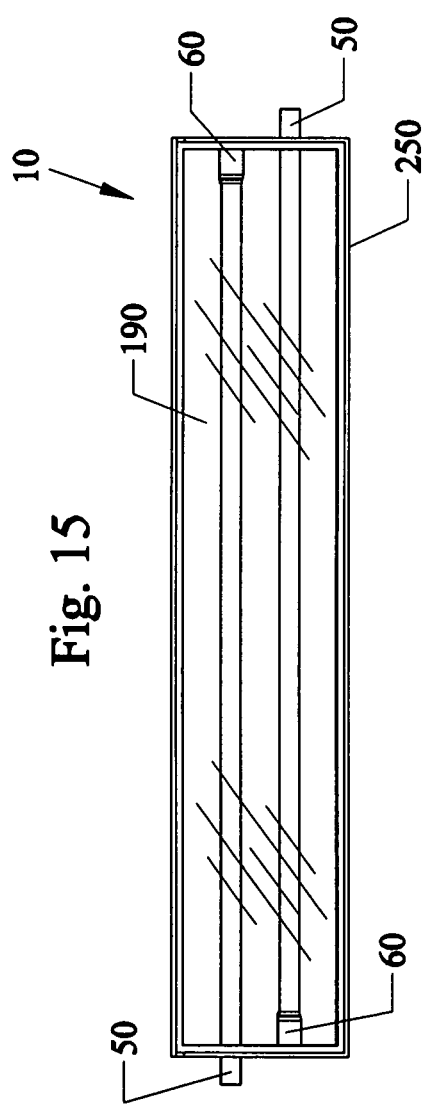
FIG. 15 is a top view of solar collector module of FIG. 13.
Figure 16:
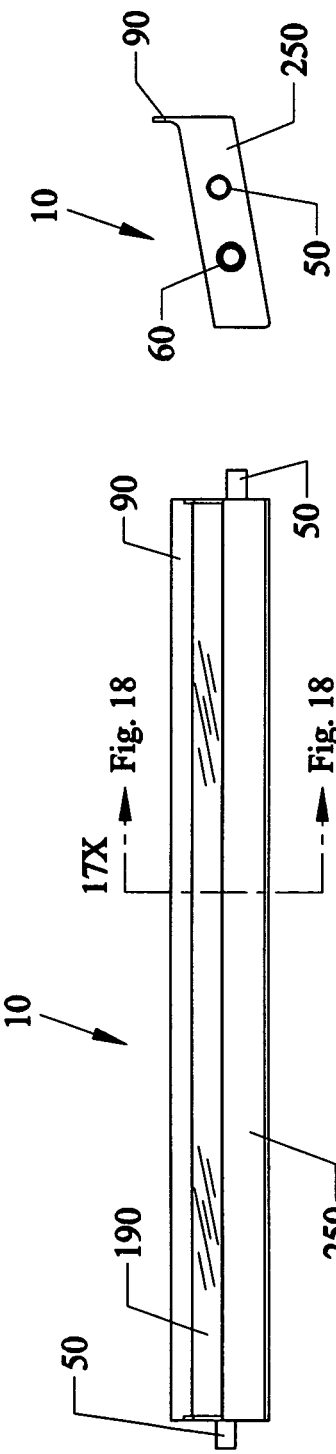
FIG. 16 is a front view of solar collector module of FIG. 13.
Figure 17:
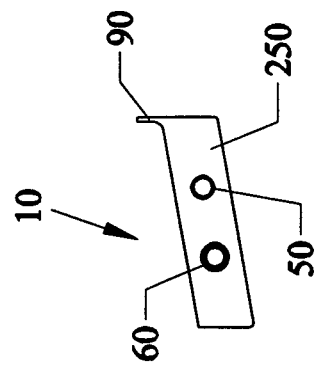
FIG. 17 is a side cross-sectional view of the module of FIG. 16 along arrows 17X.
Figure 18A:
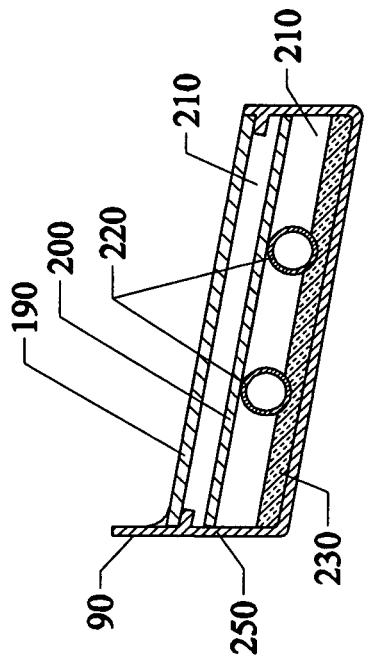
FIG. 18A is another cross-sectional view of a second module of FIG. 16 along arrows 17X.

FIG. 13 is a perspective view of a rectangular solar collector module 10 of previous figures. FIG. 14 is an exploded view of the solar collector module 10 with separate components of FIG. 13. FIG. 15 is a top view of solar collector module 10 of FIG. 13. FIG. 16 is a front view of solar collector module 10 of FIG. 13. FIG. 17 is a side cross-sectional view of the module 10 of FIG. 16 along arrows 17X. FIG. 18A is another cross-sectional view of a second module 10 of FIG. 16 along arrows 17X.

Referring to FIGS. 13-18A, the module 10 can include a rectangular box body 250 having closed sides and ends with openings 260 for the parallel pipes/conduits 220, and a closed bottom and an open top. A transparent glazing layer cover 190 covers the open top the box body 250 and sit on ledge edges 252, with a pair of pipes/conduits (such as but not limited to copper or PVC pipes, and the like) beneath the transparent glazing layer cover 190. A collector plate 200 can be located beneath the pipes/conduits 220, with a layer of insulation 230 beneath the collector plate 200 on the closed bottom of the box body 250. A pair of openings 260 in both the left side end and the right side end of the box body 250 allows for exposing the male pipe connections 50 and female pipe connections 60. An air gap 210 which can function as an extra insulator can exist between the top glazing layer cover 190 and about the pipes/conduits 220 and the upper surface of the collector plate 200.

Figure 18B:
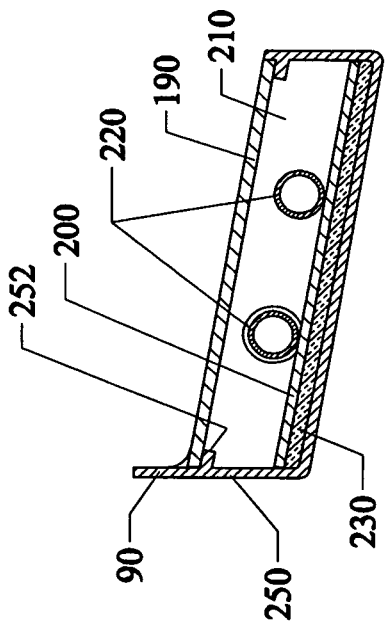
FIG. 18B is another cross-sectional view of a third module of FIG. 16 along arrows 17X.

FIG. 18B is another cross-sectional view of a third module of FIG. 16 along arrows 17X that is similar to FIG. 18A, with the exception of locating the collector plate 200 on top of the fluid pipes/conduits 220, so that an air space 210 exists above and below the collector plate 200.

Figure 18C:
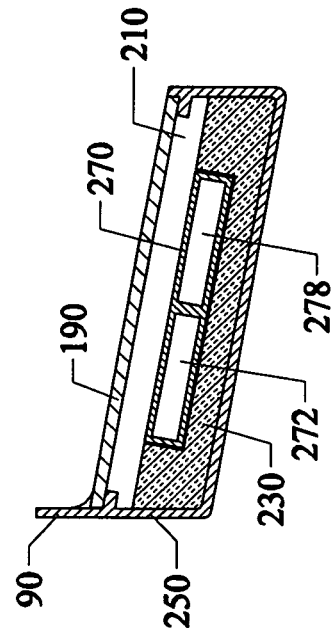
FIG. 18C is another cross-sectional view of a fourth module of FIG. 16 along arrows 17X.

FIG. 18C is another cross-sectional view of a fourth module of FIG. 16 along arrows 17X. that is similar to FIG. 18B, with the exception of sitting separate elongated collector plates 200A, 200B on top of each of the pipes/conduits 220. Here a single air space 210 can be located about the top and bottom of the collector plates 200A, 200B and is between the glazing cover 190 and the insulation layer 230.

Figure 18D:
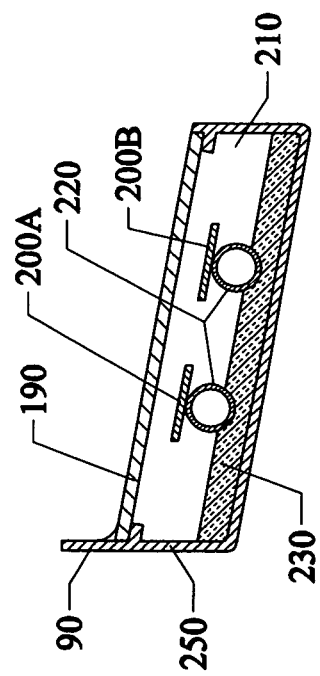
FIG. 18D is another cross-sectional view of a fifth module of FIG. 16 along arrows 17X.

FIG. 18D is another cross-sectional view of a fifth module of FIG. 16 along arrows 17X, which can be similar to the embodiment of FIG. 18B and have an extruded fluid conduit collector 270 with a pair (or more than one pair) of elongated passages 272, 278 separated from one another that replace each the pair of conduits/pipes 220 of the previous embodiments. Here the extruded conduit collector 270 can be imbedded in an insulation layer 230 with the top of the conduit collector 270 separated from the glazing cover 190 by an airspace 210 therebetween.

FIG. 19 is a top view of two solar collector modules 10 that can have a generally rectangular configuration of previous figures ready to mate. FIG. 20 is a top view of the two modules 10 of FIG. 19 mated together. FIG. 20A is an enlarged top view of the interconnected modules 10 of FIG. 20. Referring to FIGS. 19-20A, each of the male pipe connections 50 mateably insert to interconnect with the female pipe connections 60 so that the modules 10 can attach together end to end. The female pipe connections can have an internal diameter slightly larger than the exterior diameter of the male pipe connections 50. The internal diameter of the female connector 60 can slightly taper in from the ends of the modules 10 for a tight fit to be achieved.

Although a rectangular configuration is shown, the invention can be housed in bodies having other geometric shapes, such as but not limited to square, triangular, hexagon, and the like.

Gutters with Cylindrical Tube Solar Thermal Collectors

Figure 21:
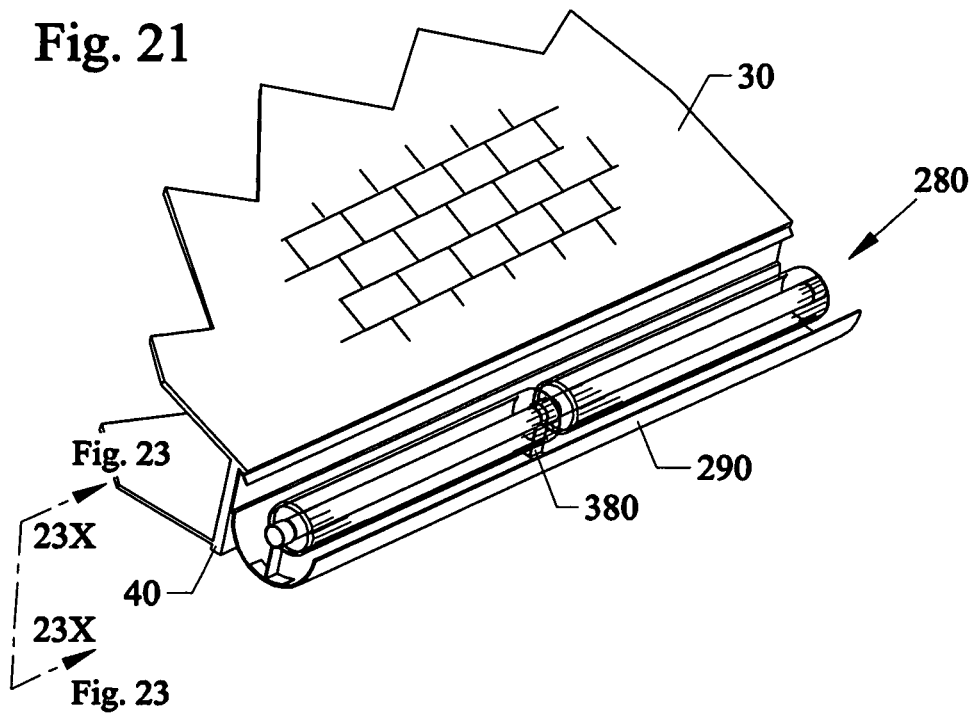
FIG. 21 is a perspective view of a tube collector modules and gutter assembly.
Figure 22:
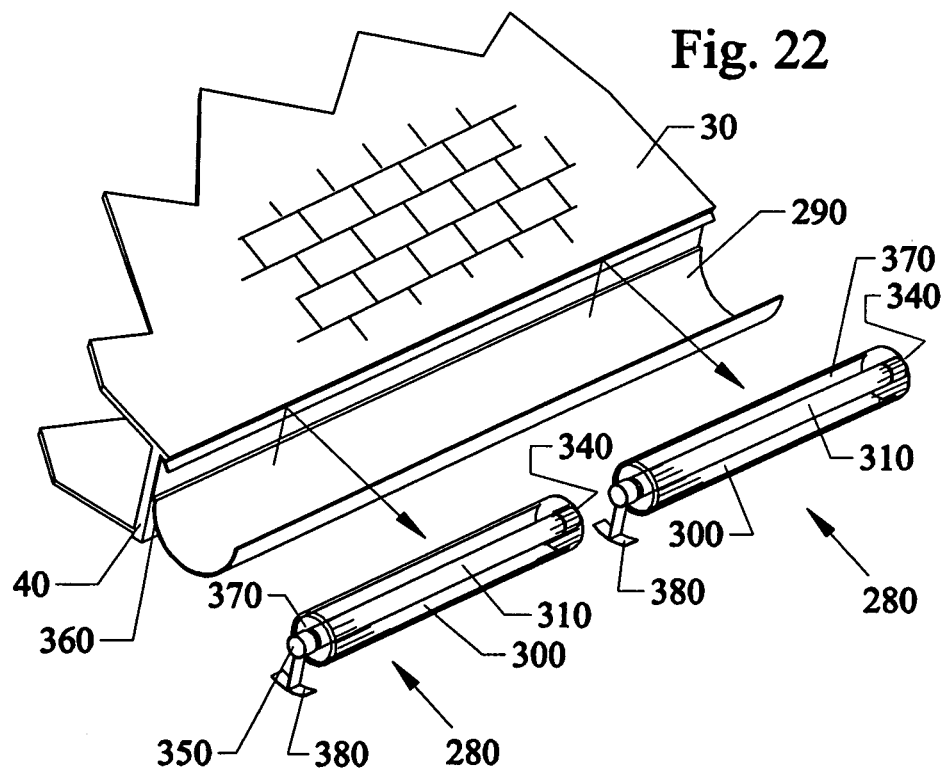
FIG. 22 is an exploded view of the tube collector modules and gutter of FIG. 21.
Figure 23:
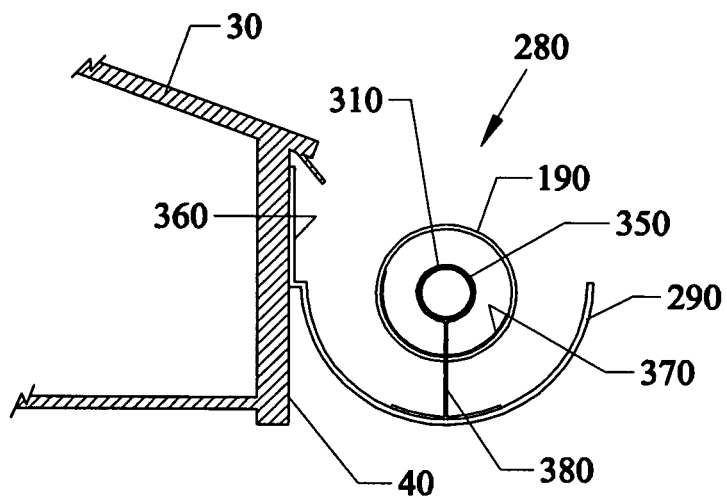
FIG. 23 is a side cross-sectional view of the modules, gutter of FIG. 21 along arrows 23X.
Figure 24:
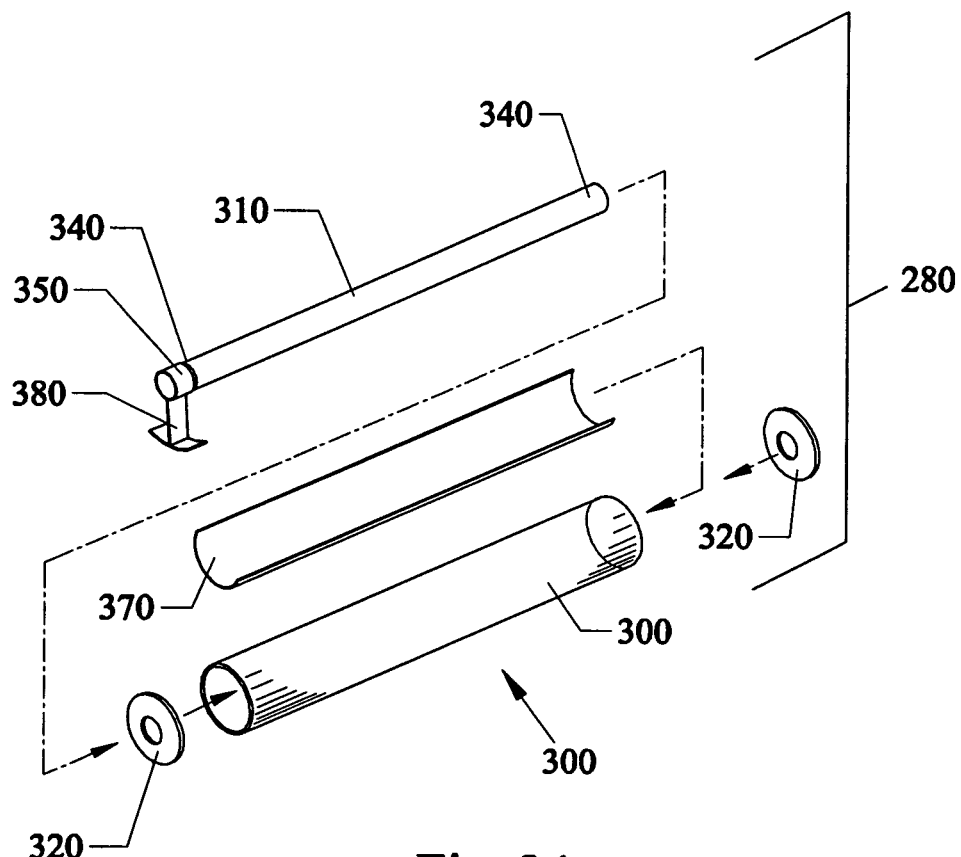
FIG. 24 is an exploded view of evacuated tube collector of FIGS. 21-23.

FIG. 21 is a perspective view of a tube collector modules 280 and gutter assembly 290. FIG. 22 is an exploded view of the tube collector modules 280 and gutter 290 of FIG. 21. FIG. 23 is a side cross-sectional view of the modules 280 and gutter 290 of FIG. 21 along arrows 23X. FIG. 24 is an exploded view of evacuated tube collector 280 of FIGS. 21-23. FIG. 25 is a top view of the two tube collectors 280 of FIG. 21 ready to mate together. FIG. 26 is a top view of two tube collectors 280 of FIG. 25 mated to one another. FIG. 26A is an enlarged top view of the interconnected modules 280 of FIG. 26. The outer tube can be made of glass or other appropriate material, single or double walled with or without appropriate coating that maximizes heat absorption, and non-evacuated versions and non-cylindrical versions are also anticipated.

Referring to FIGS. 21-26A, an evacuated tube gutter 290 can have an open half circle (curved) configuration with a flat mounting bracket side 360 that attaches to a fascia 40 along an eave portion of the lower roof edge in a manner similar to the gutter attachment techniques previously described. Positioned in the lower inner surface of the upwardly facing curved surface can be a collector/fluid tube mounting pedestal 380 that can be located at both ends the glazing tube 300. Each pedestal 380 can have an upper female connector receptacles 350 having open opposite receptical ends that receives the male ends 340 of a collector fluid tube 310. The female connector receptical can include inner diameters that taper smaller from the open ends to the middle of receptical to allow for a tighter fit. The collector tube can be supported concentrically within an outer glazing tube 300 by glazing end caps 320 having an O-ring configuration 320. Inside of the glazing tube 300 can be an elongated curved reflector 370 along a bottom inner wall of the glazing tube 300.

Soffit Fascia Mounted Lights and Solar/Photovoltaic Collectors

Figure 27:
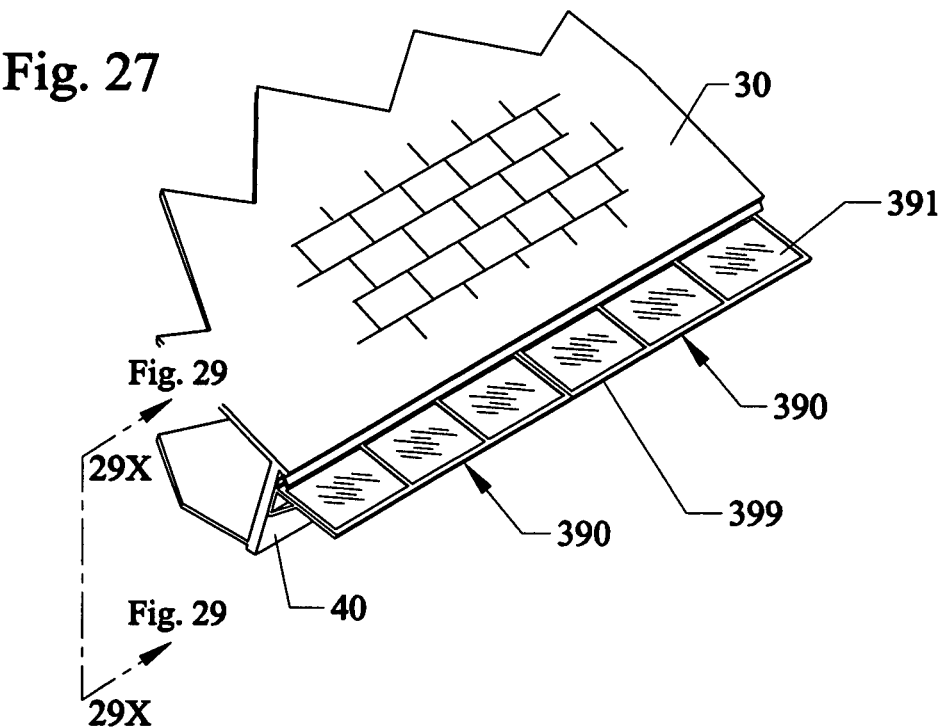
FIG. 27 is a perspective view of plural photovoltaic collectors mounted to a fascia.
Figure 28:
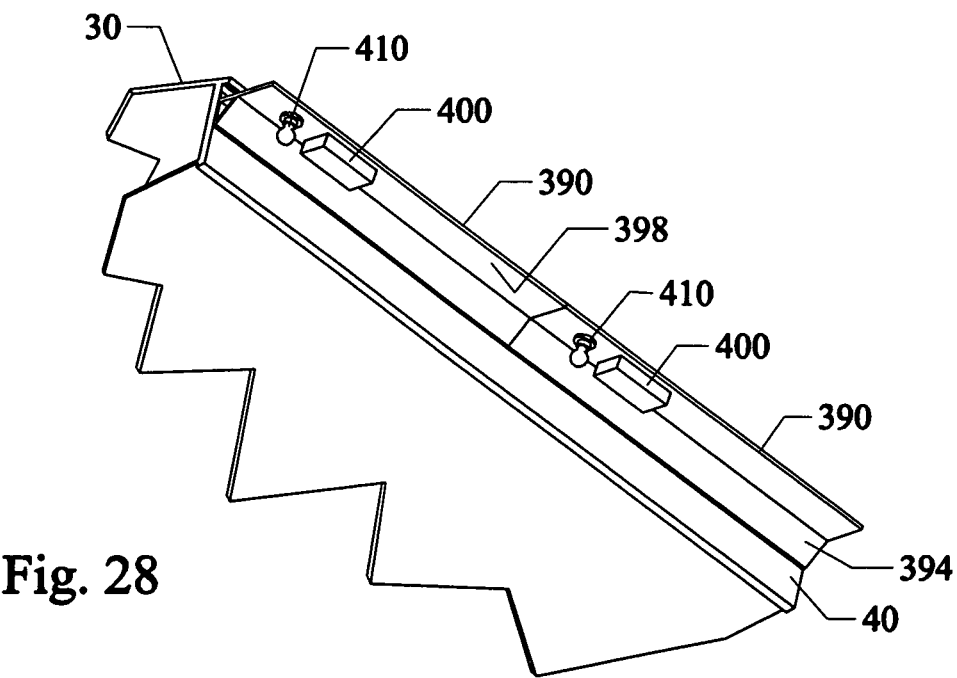
FIG. 28 is a bottom perspective view of fascia mounted collectors of FIG. 27 with lights.
Figure 29:
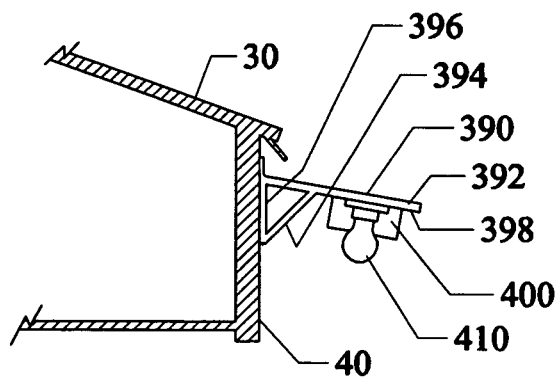
FIG. 29 is a cross-sectional view of fascia mounted collectors of FIG. 27 along arrows 29X.
Figure 30:
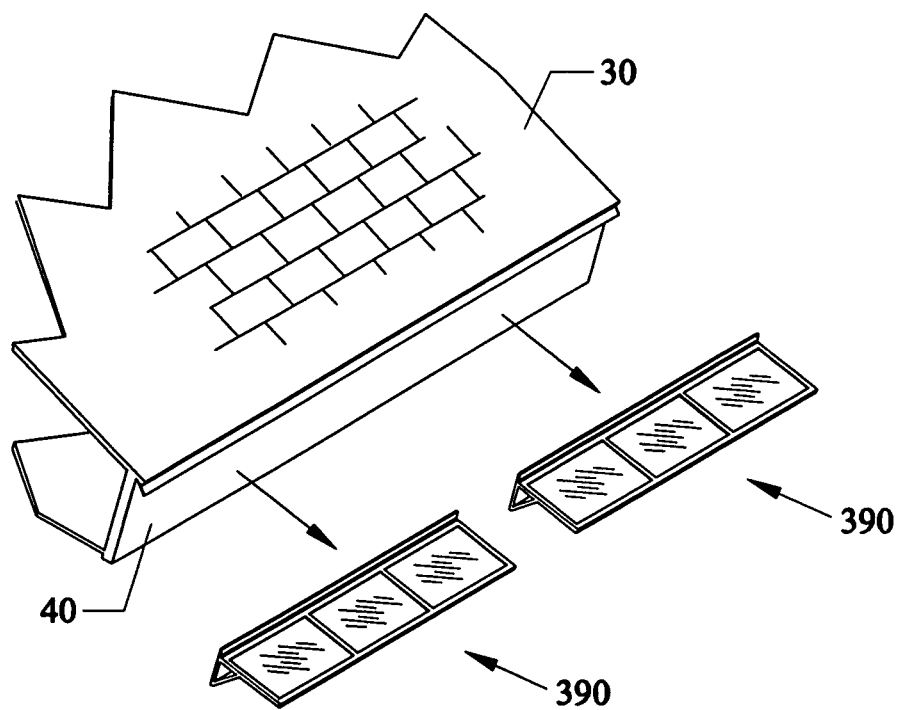
FIG. 30 is an exploded view of solar collectors and fascia of FIG. 27.

FIG. 27 is a perspective view of plural photovoltaic collectors 390 mounted to a fascia 40 off of an eave portion of a roof 30. FIG. 28 is a bottom perspective view of fascia mounted collectors 390 of FIG. 27 with lights 410 and batteries 400. FIG. 29 is a cross-sectional view of fascia mounted collectors 390 of FIG. 27 along arrows 29X. FIG. 30 is an exploded view of solar collectors 390 and fascia 40 of FIG. 27.

Referring to FIGS. 27-30, the solar collectors 390 can include an upper surface 392 having photovoltaic cells 391. A triangular mounting bracket 394 can have a rear mounting face 396 that can be attached to a fascia 40 in a manner similar to mounting a gutter that has been previously described. The solar collectors 390 can be mounted end to end and electrically connected to one another to pass the sunlight generated power into batteries 400 located on an under surface 398. The batteries 400 can supply power to the lights 410 such as light bulbs, and the like, also attached to an extending below the lower surface 398 of the solar collector 390. The solar collectors 390 can have an upper surface 392 that slants downward away from the fascia 40 so as to aid in draining water from the roof and over the outer exposed edge 399 of the solar collectors 390. Additionally, light sensors can be included for turning the lights 410 during night time or dark conditions, and turning the lights off during daylight hours. The photovoltaic collectors can also be used for other purposes such as providing electrical power to other home appliances or via an inverter, providing power to the utility electrical grid.

Gutters with Lights and Solar/Photovoltaic Collectors

Figure 31:
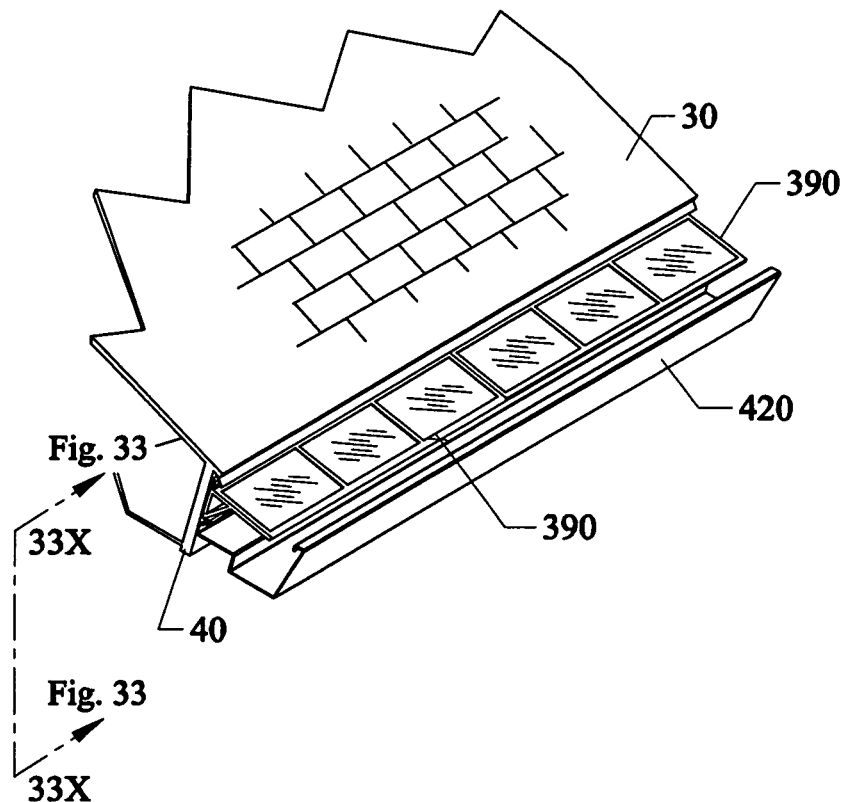
FIG. 31 is a top perspective view of photovoltaic collector in a gutter assembly.
Figure 32:
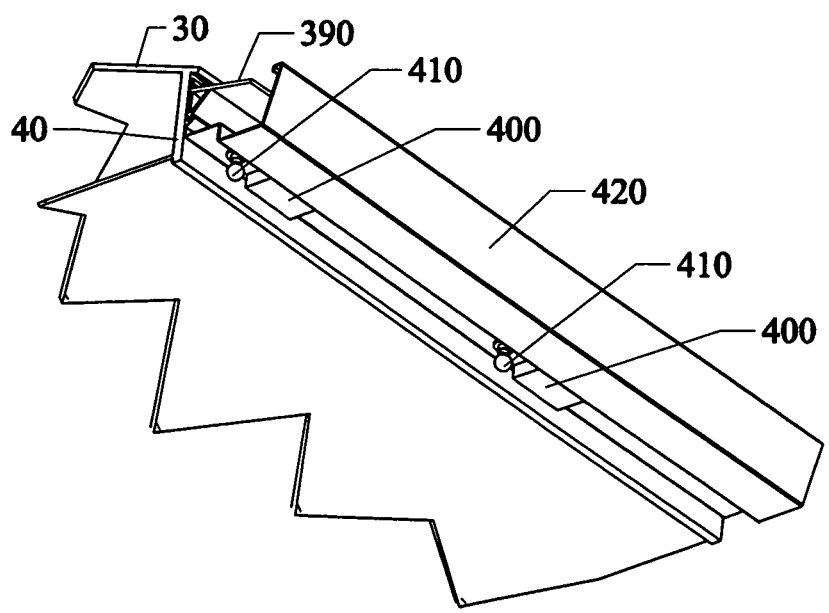
FIG. 32 is a bottom perspective view of the collectors and gutter of FIG. 31 with light.
Figure 33:
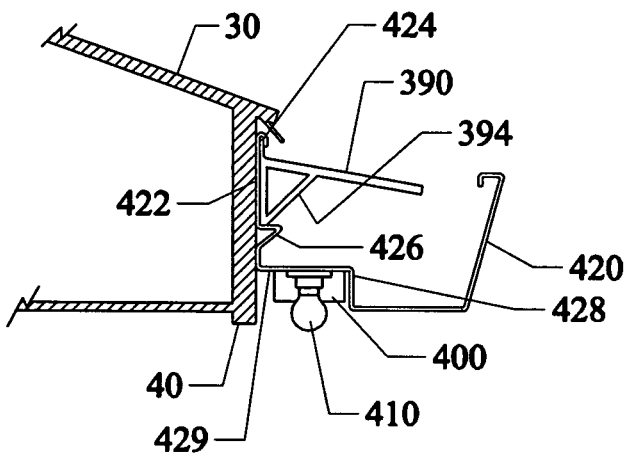
FIG. 33 is a cross-sectional view of the gutter collector of FIG. 31 along arrows 33X.
Figure 34:
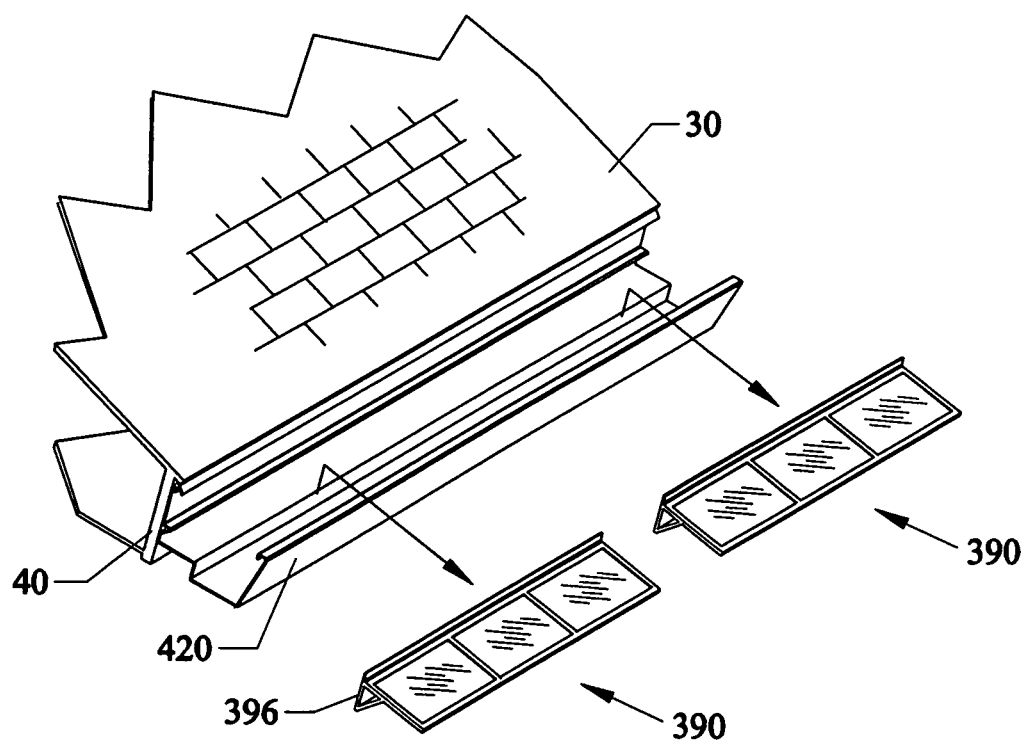
FIG. 34 is an exploded view of solar collector and gutter of FIG. 31.

FIG. 31 is a top perspective view of photovoltaic collector 390 in a gutter assembly 420. FIG. 32 is a bottom perspective view of the collectors 390 and gutter 420 of FIG. 31 with lights positioned below the gutters 420. FIG. 33 is a cross-sectional view of the gutter collector 420 of FIG. 31 along arrows 33X. FIG. 34 is an exploded view of solar collector 390 and gutter 420 of FIG. 31.

Referring to FIGS. 31-34, a gutter assembly 420 can have a gutter 420 similar to the gutter 20 of the previous FIGS. 1-3 by having an upper mounting hook 424 similar to hook 70 and a step ledge portion 426 similar to mounting step 80, that are along rear back wall 422 of the gutter 420. The rear back wall 422 of the gutter 420 can be mounted to the fascia 40 in a manner similar to the other gutter mounting techniques previously described. The solar collectors 390 can be installed in the gutter assembly 420 by angling and inserting the upper rear edge of the rear mounting face 396, after which the lower rear edge of the mounting face 396 is positioned to sit on step ledge 426. In operation, water flowing off roof 30 can flow into the open front end of gutter assembly 420. The inside of the gutter assembly 420 can include a stepped floor configuration so that the lights 410 and batteries 400 can be mounted in a semi-closed and protected space 429 underneath the gutter assembly 400.

Architectural Ledge Mounted Solar/Photovoltaic Collectors

Figure 35:
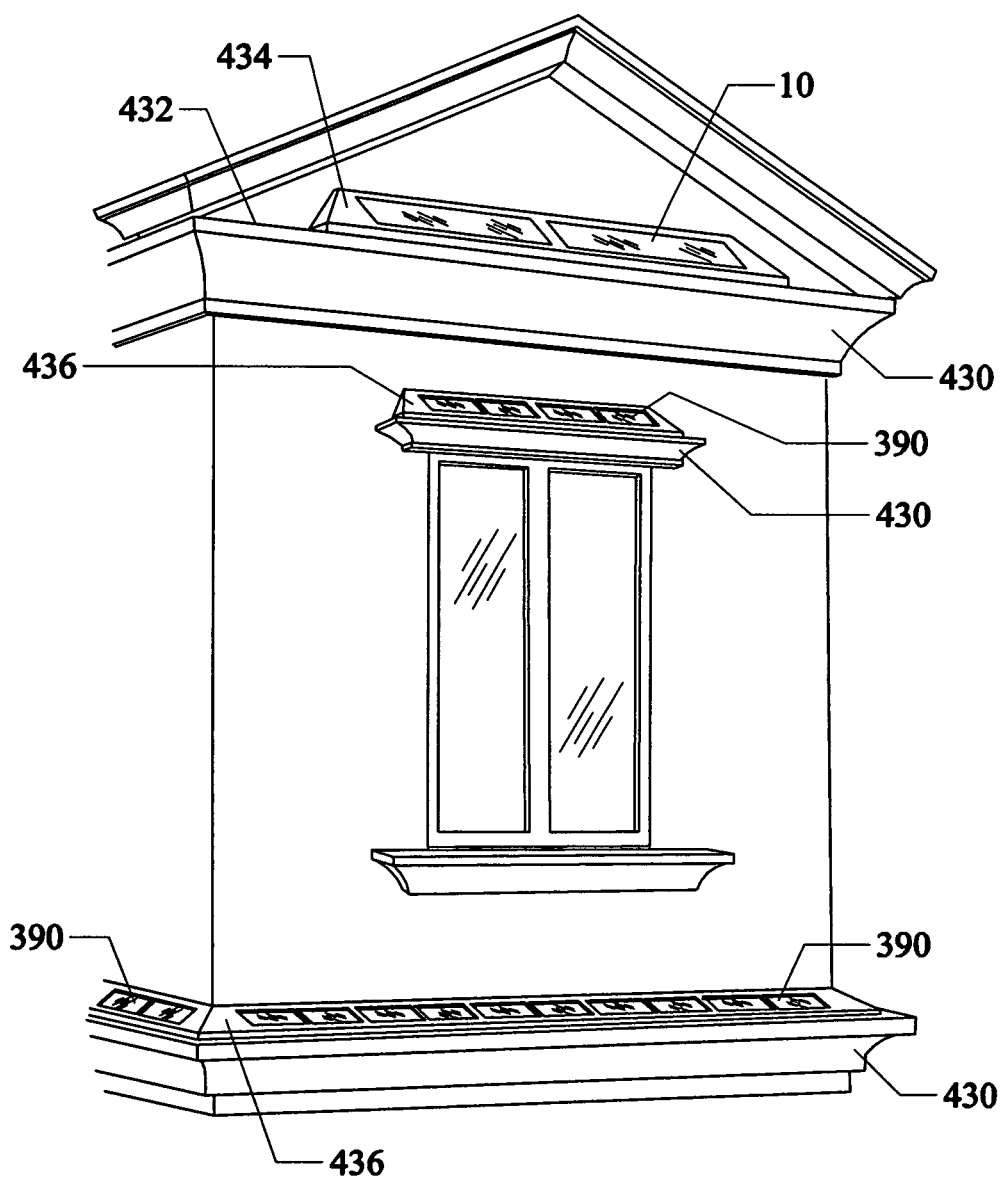
FIG. 35 is a perspective view of photovoltaic collectors and solar collectors mounted on architectural ledges of a building structure such as a home.

FIG. 35 is a perspective view of photovoltaic collectors 10 and solar collectors 390 previously described mounted on architectural ledges 430 of a building structure such as a home. Many building structures have exterior decorative ledges 430 that can have flat upper surfaces or slightly angled upper surfaces 432. The photovoltaic collectors 10 can positioned in frames 434 that can then lay against or be fastened to the upper surfaces 432 of the ledges 430. Similarly, the solar collectors 390 can be mounted in frames 436 that can also lay on or be fastened to the upper surfaces 432 of the architectural ledges 432. The mounting frames 434, 436 can have ends that interconnect adjacent frames so that the collectors 10, 390 can be positioned about corners of the building structure.

Ground Engaging Solar/Photovoltaic Collectors

Figure 36:
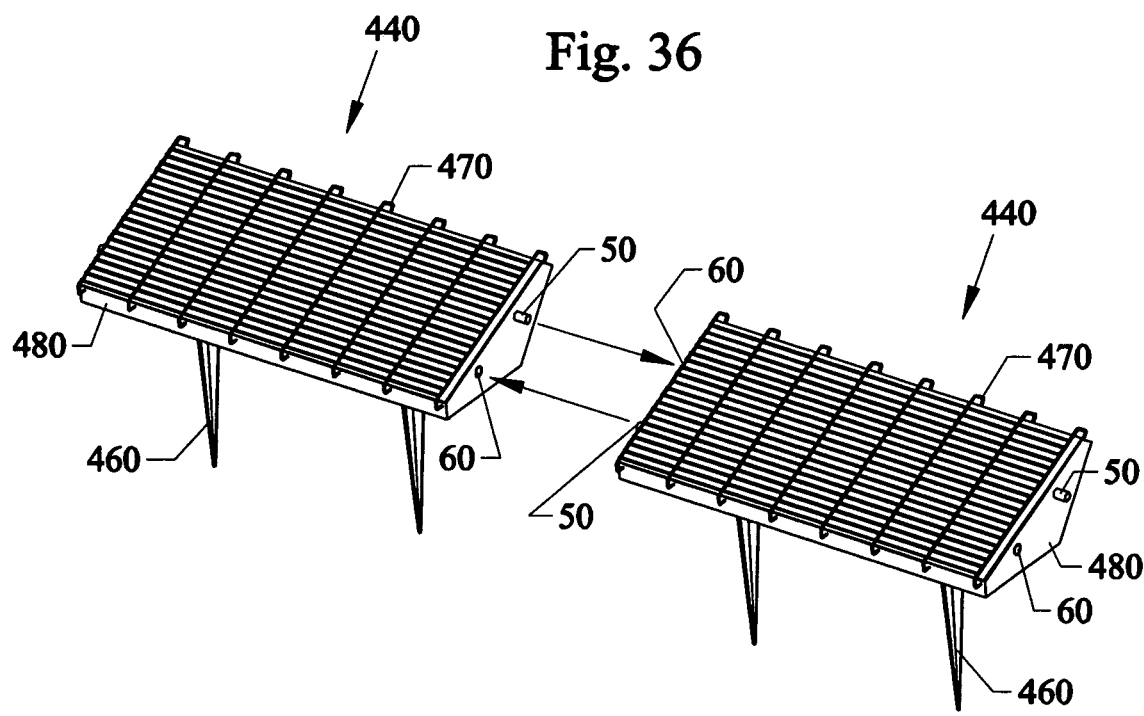
FIG. 36 is a perspective view of two ground mounted collectors ready to mate.
Figure 37:
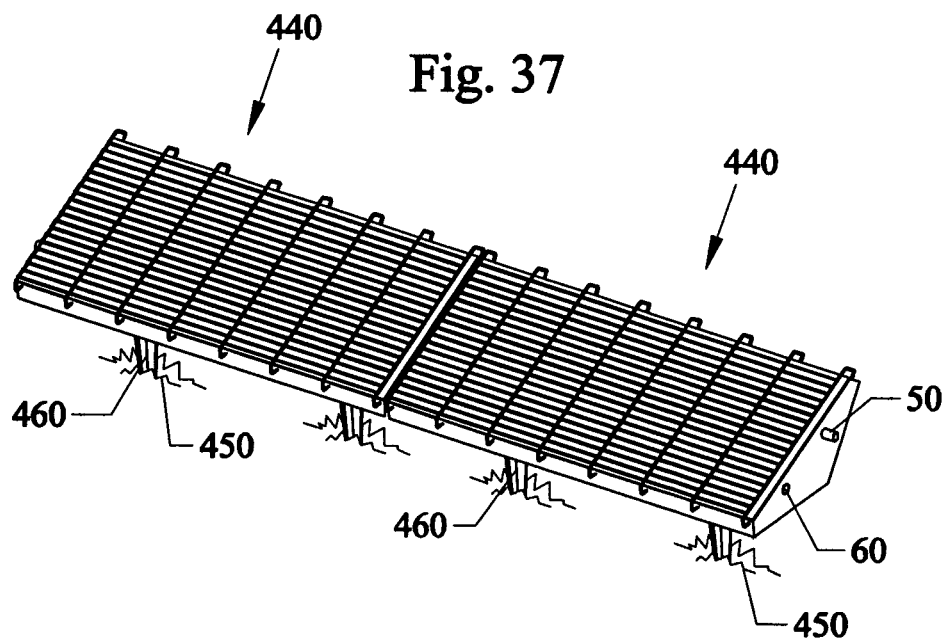
FIG. 37 is a perspective view of two ground mounted collectors of FIG. 36 mated together.
Figure 42:
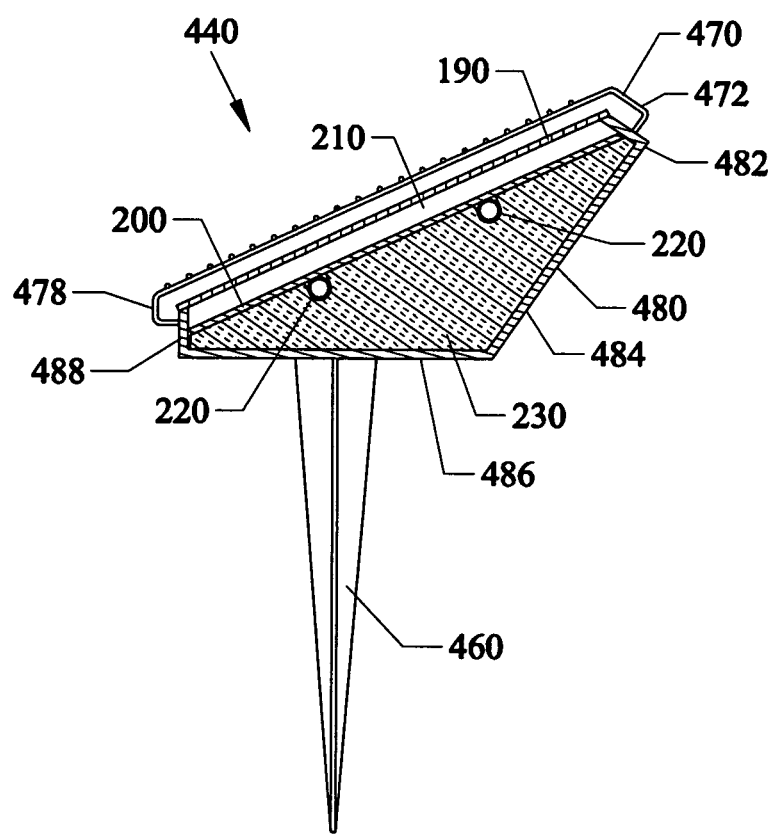
FIG. 42 is a cross-sectional view of the collector of FIG. 40 along arrows 42X.
Figure 43:
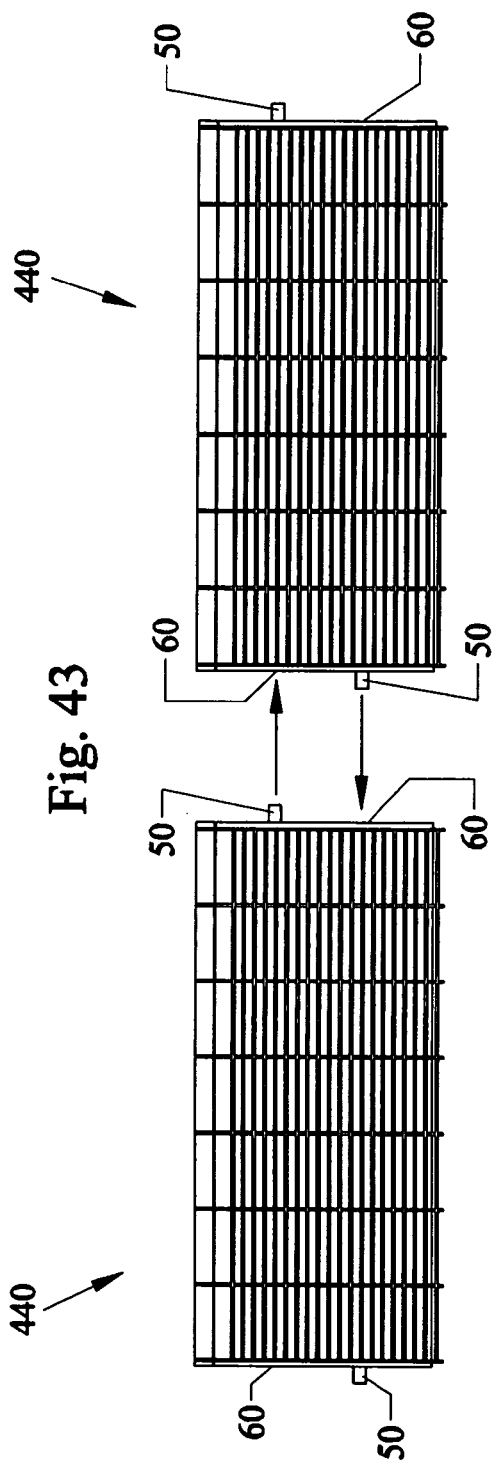
FIG. 43 is a top view of two ground mounted collectors ready to mate together.
Figure 44:
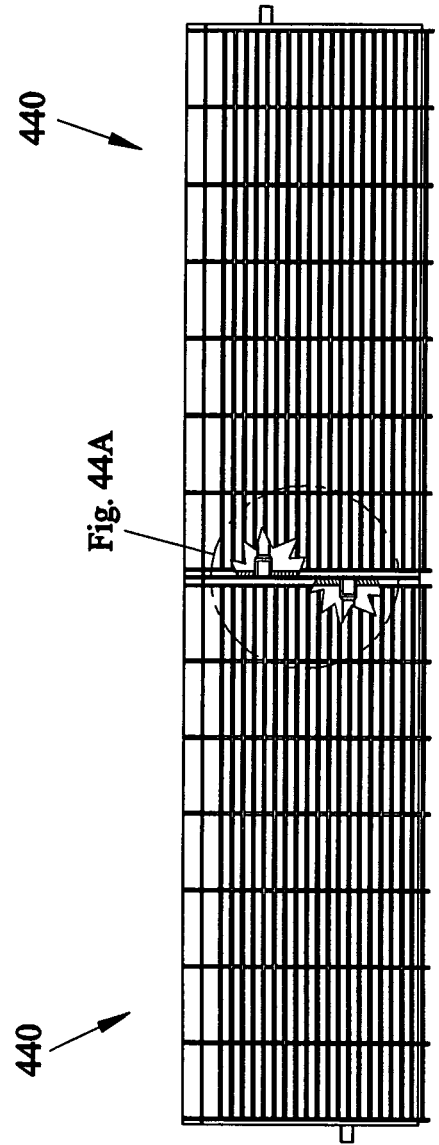
FIG. 44 is a top view of the ground mounted collectors of FIG. 43 mated together.

FIG. 36 is a perspective view of two ground mounted collectors 440 ready to mate to one another when mounted in the ground together. FIG. 37 is a perspective view of two ground mounted collectors 440 of FIG. 36 mated together. FIG. 38 is a top view of a single ground mounted collector 440 of FIG. 36. FIG. 39 is a left side view of the ground mounted collector 440 of FIG. 38. FIG. 40 is a front view of the ground mounted collector 440 of FIG. 38. FIG. 41 is a right side view of ground mounted collector 440 of FIG. 38. FIG. 42 is a cross-sectional view of the collector 440 of FIG. 40 along arrows 42X. FIG. 43 is a top view of two ground mounted collectors 440 ready to mate together. FIG. 44 is a top view of the ground mounted collectors 440 of FIG. 43 mated together. FIG. 45 is an enlarged top view of the interconnected collectors 440 of FIG. 44.

Referring to FIGS. 36-45, a ground mounted collector 440 can include a burn safety guard grill 470 having parallel longitudinal slats. The grill 470 can have an upper end 472 attached to an upper end 482 of a generally triangular collector housing body 480, and a lower end 478 attached to a lower front edge 488 of the housing body 480. Inside of the triangular collector body 480 can be an insulation layer 230 against a lower floor surface 486 and against the rear wall surface 484. A pair (or pairs) of conduits/pipes 220 can pass through the insulation layer 220 and have male connectors 50 and female connectors 60, each located on opposite sides of the ground mounted collector. A collector plate 200 can be positioned against an upper surface of the conduits/pipes 220 and an upper surface of the insulation layer 220. A transparent glazing cover 190 can cover the top open angled end of the ground mounted collector 440, and an airspace can be formed between the glazing cover 190 and the collector plate 200. The grill 470 can be raised above the outside of the collector plate 200 to eliminate the chances of someone getting burned by touching the collector plate 200.

Underneath each of the ground based collectors 400 can be a pair of downwardly pointing ground engaging spikes 460 for allowing the collectors to be easily mounted in ground surfaces. Each of the collectors 440 can be attached to one another by mateably attaching male connectors 50 with female connectors 60 on the sides of each collector in a manner similar to the previous embodiments described above. Similarly, the conduits/pipes 220 can also run water therethrough that can be heated for hot water heater applications, swimming pools, spas, and the like.

The ground based collectors can be mounted in the ground adjacent to building structures, adjacent swimming pools, spas, and along pathways, and the like. The ground based collectors can also be mounted to the side of a building, at any height with any number of mounting methods, including the two described above instead of using the ground spikes. One possible mounting strategy here would be to mount the collectors to the wall within a few feet of the ground so that they can be somewhat hidden from view by shrubs or other landscaping, the landscaping being planted and maintained in such a way as to not block the collectors from the sun.

FIG. 46 is a side view of a building structure with roof having a collector mounting plate 510 mounted thereon. As shown, the invention can be mounted on a siding portion of a building between the roof and the ground. FIG. 47 is a side view of collector module 550 with shim mount 560. FIG. 48A is a side view of an angled collector North mounting plate 520 mounted with the collector being approximately 10 degrees from vertical. FIG. 48B is a side view of another angled collector Central mounting plate 530 mounted with collector being approximately 5 degrees angled down from vertical. FIG. 48C is a side view of a South mount with a perpendicular collector mounting plate 540 with collector being approximately 0 degrees from vertical.

While some of the embodiments described tubes/conduits for water and some described charging powering lights, all the embodiments described above can be used with tubes/conduits and for powering lights. Additionally, all of the embodiments described above can be used with the combination of heating water through conduits/pipes as well as powering light sources.

Although some embodiments described using photovoltaic collectors and some described solar collectors, each of the embodiments listed above can be used with either photovoltaic collectors or solar collectors.

The invention can be used with different types of materials for the components. For example, the insulative material, can include but is not limited to polyisocyanurate foam sheet board. The collector material, can include but is not limited to copper The inner metal reflector/collector is a tube, can be a dark color, such as but not limited to black to maximize absorption of heat, not reflection. The glass tube can also have a reflective coating on the inner surface designed to reflect re-radiated heat back to the tube/collector surface. The photovoltaic material, can be material such as but not limited to crystalline and thin-film. The glazing layer cover can be formed from material, such as but not limited to glass.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A solar collector mounting system for roof eaves comprising:
   an elongated rain gutter having an elongated bracket adapted to be attached along an cave portion of a lower roof edge of a roof, the elongated bracket having a first end and a second end and a top edge;
   an elongated hook formed on the top edge of the elongated bracket, running from the first end to the second end of the elongated bracket, the elongated hook having a downwardly facing open end, the elongated hook protrudes outward from the cave portion of the roof;
   an indentation in a back wall of the elongated gutter forming an elongated step running along a lower portion of the elongated bracket, the elongated step being parallel to and spaced below the elongated hook, the elongated step protrudes outward away from the eave portion of the roof; and
   an elongated modular solar collector having a rear wall and a front wall and a top side and a bottom side and a weight, the rear wall having an upwardly extending edge, and the bottom wall having a rear bottom edge, wherein the elongated modular solar collector is mounted to the bracket by inserting the upwardly extending edge of the elongated modular solar collector into the downwardly facing open end of the elongated hook of the bracket, and by supporting the rear bottom edge of the elongated modular solar collector on a top surface of the elongated step of the elongated bracket, so that the solar collector extends off of the lower roof edge, and wherein the bracket is fastened to the eave portion and does not penetrate through the roof, and wherein all of the weight of the elongated solar collector is completely supported by the elongated hook and the elongated step; wherein the module includes:
   a rectangular box having closed sides and closed bottom and open top; a transparent layer in the open top the box; a pair of conduits beneath the transparent layer; a collector plate beneath the conduits; a layer of insulation beneath the collector plate on the closed bottom of the box;
   a pair of openings in a left side end of the box for exposing a left end of the pair of the conduits; and
   a pair of openings in a right side end of the box for exposing a right end of the pair of the conduits.

2. The solar collector mounting system of claim 1, further comprising:
   a gutter along the eave portion for supporting the bracket mounted collector in a raised position above a lower interior floor surface of the gutter.

3. The solar collector mounting system of claim 1, further comprising:
   a second solar collector module having a pair of pipes mateably interconnected with the first module having a pair of pipes.

4. The solar collector mounting system of claim 3, wherein each collector module includes:
   a left end with a male protruding pipe connector and a female receptical pipe connector; and
   a right end with a male protruding pipe connector and a female receptical pipe connector.

5. The solar collector mounting system of claim 1, further comprising:
   a battery on the module for being charged by the modular solar collector; and
   a light source underneath the module for being powered by the battery.

6. The solar collector mounting system of claim 1, further comprising:
   a gutter along the eave portion for supporting the bracket mounted collector;
   a battery being charged by the modular solar collector; and
   a light source underneath the gutter for being powered by the battery.

7. A solar collector mounting system for roof eaves comprising:
   an elongated gutter adapted to be attached along an eave portion of a lower roof edge of a roof, the elongated gutter having a rear wall adjacent to the lower roof edge and a front wall spaced outwardly away from the rear wall, and a water collection area between the rear wall and the front wall for receiving rainwater therein;
   an indentation in a back wall of the elongated gutter forming an elongated bracket along the front wall of the gutter, the elongated bracket having a first end and a second end and a top edge;
   an elongated hook formed on the top edge of the elongated bracket, running from the first end to the second end of the elongated bracket, the elongated hook having a downwardly facing open end;
   an elongated step running along a lower portion of the elongated bracket, the elongated step being parallel to and spaced below the elongated hook; and
   an elongated modular solar collector having a rear wall and a front wall and a top side and a bottom side and a weight, the front wall having an upwardly extending edge, and the bottom wall having a front bottom edge, wherein the elongated modular solar collector is mounted to the bracket by inserting the upwardly extending edge of the elongated modular solar collector into the downwardly facing open end of the elongated hook of the bracket, and by supporting the front bottom edge of the elongated modular solar collector on a top surface of the elongated step of the elongated bracket, so that the solar collector extends off the lower roof edge, and wherein the solar collector is fastened to the gutter and does not penetrate through the roof, and wherein all of the weight of the elongated solar collector is completely supported by the elongated hook and the elongated step; wherein the module includes:
   a rectangular box having closed sides and closed bottom and open top; a transparent layer in the open top the box; a pair of conduits beneath the transparent layer; a collector plate beneath the conduits; a layer of insulation beneath the collector plate on the closed bottom of the box;
   a pair of openings in a left side end of the box for exposing a left end of the pair of the conduits; and
   a pair of openings in a right side end of the box for exposing a right end of the pair of the conduits.

8. The solar collector mounting system of claim 7, further comprising:
   a second solar collector module having a pair of pipes mateably interconnected with the first module having a pair of pipes.

9. The solar collector mounting system of claim 8, wherein each collector module includes:
   a left end with a male protruding pipe connector and a female receptical pipe connector; and
   a right end with a male protruding pipe connector and a female receptical pipe connector.

10. A solar collector mounting system for roof eaves comprising:
   an elongated gutter adapted to be attached along an eave portion of a lower roof edge of a roof, the elongated gutter having a rear wall adjacent to the lower roof edge and a front wall spaced outwardly away from the rear wall, and a water collection area between the rear wall and the front wall for receiving rainwater therein;
   a mounting member on the rear wall of the gutter having an indentation;
   an elongated modular solar collector having a rear wall and a front wall and a top side and a bottom side and a weight, the front wall having an upwardly extending edge, and the bottom wall having a front bottom edge, wherein an upper top edge and a bottom lower edge of the rear wall of the elongated modular solar collector is mounted and supported by the mounting member, wherein the solar collector is fastened to the gutter and does not penetrate through the roof, and wherein all of the weight of the elongated solar collector is completely supported by the gutter; wherein the module includes:
   a rectangular box having closed sides and closed bottom and open top; a transparent layer in the open top the box; a pair of conduits beneath the transparent layer; a collector plate beneath the conduits; a layer of insulation beneath the collector plate on the closed bottom of the box;
   a pair of openings in a left side end of the box for exposing a left end of the pair of the conduits; and
   a pair of openings in a right side end of the box for exposing a right end of the pair of the conduits.

* * * * *